(12) United States Patent  
Chitrakar et al.

(10) Patent No.: US 11,979,827 B2  
(45) Date of Patent: May 7, 2024

(54) COMMUNICATION APPARATUS AND COMMUNICATION METHOD FOR MULTI-BAND TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 373 days.

(21) Appl. No.: 17/284,743

(22) PCT Filed: Aug. 15, 2019

(86) PCT No.: PCT/SG2019/050403  
§ 371 (c)(1),  
(2) Date: Apr. 12, 2021

(87) PCT Pub. No.: WO2020/085997  
PCT Pub. Date: Apr. 30, 2020

(65) Prior Publication Data  
US 2021/0360522 A1 Nov. 18, 2021

(30) Foreign Application Priority Data  
Oct. 26, 2018 (SG) .............................. 10201809503R

(51) Int. Cl.  
*H04W 52/02* (2009.01)  
*H04L 1/18* (2023.01)  
(Continued)

(52) U.S. Cl.  
CPC ....... *H04W 52/0206* (2013.01); *H04L 1/1896* (2013.01); *H04L 5/0098* (2013.01)

(58) Field of Classification Search  
CPC . H04W 52/0206; H04L 1/1896; H04L 5/0098  
(Continued)

(56) References Cited

U.S. PATENT DOCUMENTS 7,797,018 B2 9/2010 Chandra  
2012/0026997 A1 2/2012 Seok et al.  
(Continued)

FOREIGN PATENT DOCUMENTS

EP 3036958 B1 * 1/2019 ................ H04J 3/16  
JP 2018505606 A 2/2018  
WO WO 2018194726 A1 10/2018

OTHER PUBLICATIONS

International Search Report, dated Oct. 22, 2019, for corresponding International Application No. PCT/SG2019/050403, 3 pages.  
(Continued)

*Primary Examiner* — Gbemileke J Onamuti  
(74) *Attorney, Agent, or Firm* — Seed IP Law Group LLP

(57) ABSTRACT

A multi-band communication device includes: one or more transceiver circuitries, each of which in operation transmits and receives data on a plurality of channels in different frequency bands; and a band configuration circuitry operative to change a configuration of any one of the transceiver circuitries based on configuration information received from a multi-band Access Point (AP). The configuration information specifies one of the frequency bands as a Primary band and the other frequency bands as Secondary band(s). The transceiver circuitry operating on the Primary band is used as a default circuitry for communication with the AP.

16 Claims, 21 Drawing Sheets

(51) Int. Cl.
*H04L 1/1867* (2023.01)
*H04L 5/00* (2006.01)

(58) Field of Classification Search
USPC .......................................... 370/329
See application file for complete search history.

(56) References Cited

U.S. PATENT DOCUMENTS

| | | |
|---|---|---|
| 2013/0077554 A1 | 3/2013 | Gauvreau et al. |
| 2015/0023177 A1 | 1/2015 | Xi et al. |
| 2015/0078298 A1 | 3/2015 | Barriac et al. |
| 2016/0044676 A1 | 2/2016 | Choi et al. |
| 2016/0219510 A1 | 7/2016 | Asterjadhi et al. |
| 2017/0245203 A1* | 8/2017 | Cariou ............... H04W 48/14 |
| 2018/0092039 A1 | 3/2018 | Cariou et al. |
| 2018/0213593 A1 | 7/2018 | Kang et al. |

OTHER PUBLICATIONS

Partial Supplementary European Search Report, dated Dec. 2, 2021, for European Application No. 19876545.5-1205, 14 pages.

* cited by examiner

COMMUNICATION APPARATUS AND COMMUNICATION METHOD FOR MULTI-BAND TRANSMISSION

BACKGROUND

1. Technical Field

The present disclosure generally relates to multi-band communication apparatuses, multi-band access points and communication methods for multi-band transmission, and more particularly relates to multi-band communication devices that operate on multiple frequency bands in a wireless network.

2. Description of Related Art

Wireless networks that offer multi-band communication enable electronic devices to communication over multiple different frequency bands. Such networks have advantages over other wireless networks in which wireless communication is limited to a single frequency band.

Since each frequency band may be implemented as a separate radio (i.e. each with one or more antennas and related circuitry), simultaneous idle listening to channels on multiple bands increases power consumption for non-Access Point (AP) stations (STAs). Accordingly, it is desirable to reduce idle listening power consumption of multi-band non-AP STAs.

SUMMARY

One non-limiting and exemplary embodiment facilitates reducing idle listening power consumption of multi-band non-AP STAs. In one general aspect, the techniques disclosed here feature a multi-band communication device including: one or more transceiver circuitries, each of which in operation transmits and receives data on a plurality of channels in different frequency bands; and a band configuration circuitry operative to change a configuration of any one of the transceiver circuitries based on configuration information received from a multi-band Access Point (AP). The configuration information specifies one of the frequency bands as a Primary band and the other frequency bands as Secondary band(s). The transceiver circuitry operating on the Primary band is used as a default circuitry for communication with the AP.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Skilled artisans will appreciate that elements in the figures are illustrated for simplicity and clarity and have not necessarily been depicted to scale.

DETAILED DESCRIPTION

Multi-band communication devices are capable of transmitting and receiving data over multiple different frequency bands in a wireless network. These electronic devices have many advantages over conventional electronic devices that are capable of operating in a single frequency band. Operating multi-band communication devices in wireless networks, however, has numerous technical problems. For the avoidance of doubt, in the following description, "multi-band transmission" refers to concurrent communication on multiple channels on multiple frequency bands.

For example, since each frequency band may be implemented as a separate radio (i.e. each with one or more antennas and related circuitry), simultaneous idle listening to channels on multiple bands increases power consumption for non-Access Point (AP) stations (STAs). Accordingly, example embodiments seek to reduce idle listening power consumption of multi-band non-AP STAs and other technical problems that occur with the operation of multi-band communication devices in multi-band wireless networks.

Multi-band capable Extremely High Throughput (EHT) STAs may be classified according to their multi-band operating capabilities as:

Non-concurrent (NC) multi-band: Only able to communicate on a single band at a time, but able to switch bands without additional configurations.

Concurrent Dual-band: Able to concurrently communicate on any two bands.

Concurrent Tri-band: Able to concurrently communicate on all three bands (e.g. 2.4/5/6 GHz).

In the present disclosure, it is assumed that the APs are concurrent tri-band capable. Although there is no assumption about basic service set (BSS) operations in the present disclosure (either single Band BSS or multi-band BSS), it is also possible that the AP maintains a separate BSS on each frequency band, in which case the terms "band" and "BSS" may be used interchangeably, e.g. 2.4 GHz band may also refer to the BSS on the 2.4 GHz band.

Furthermore, multi-band transmission/reception is assumed to be already enabled (either natively during a multi-band association or through Fast Session Transfer (FST) Setup after a STA has associated with multiple BSSs operated by co-located APs on different frequency bands) prior to the multi-band operation. It is assumed that the AP and a multi-band STA have already exchanged capabilities and other related parameters on each of the frequency bands/BSS and have all the information required to participate in multi-band communication with each other.

Figure 1:
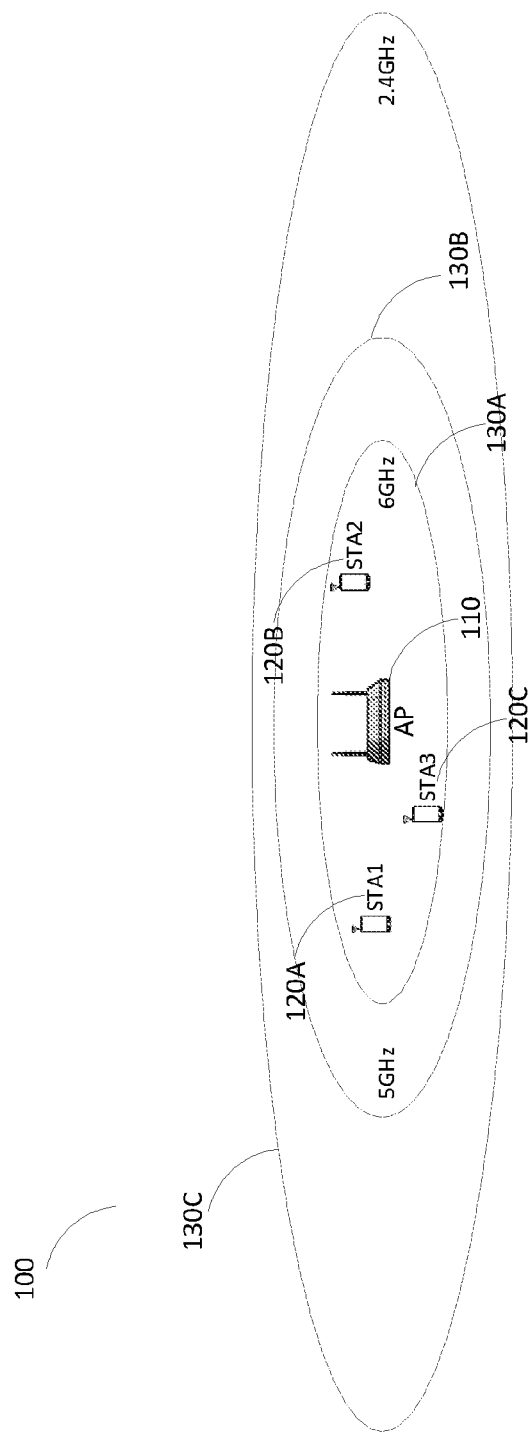
FIG. 1 shows a multi-band wireless network in which a wireless transmitter/receiver operates over multiple different frequency bands with multi-band communication devices.

FIG. 1 shows a multi-band wireless network 100 in which a wireless transmitter/receiver 110 operates over multiple different frequency bands with multi-band communication devices 120A, 120B and 120C. By way of example, the wireless transmitter/receiver 110 is shown as an Access Point (AP), and the multi-band communication devices 120A, 120B and 120C are shown as non-AP stations (STAs) STA1, STA2 and STA3. The multiple different frequency bands include, but are not limited to, 6 GHz, 5 GHz, and 2.4 GHz. As shown, the AP 110 may provide three basic service sets (BSSs) as 6 GHz (BSS) 130A, 5 GHz BSS 130B, and 2.4 GHz BSS 130C. Alternatively, the AP 110 may also operate a single unified BSS that seamlessly operates on all the three frequency bands.

The AP 110 is an EHT AP which functions as a multi-band communication device that operates on multiple different frequency bands, as opposed to an AP capable of operating on a single frequency band with single-band devices. The AP 110 can function as an independent AP on each of the different multiple frequency bands. Alternatively, the AP 110 may also function as a unified AP that seamlessly operates on all the three frequency bands.

According to an example embodiment, a Multi-Band (MB) Power Save mode is provided for multi-band capable non-AP STAs.

During an Initial Configuration Phase, for a multi-band non-AP STA (e.g. STA1 120A, STA2 120B and STA3 120C shown in FIG. 1), one frequency band is assigned by the AP (e.g. by the AP 110 shown in FIG. 1) as a Primary band (or primary BSS). The other frequency bands may be assigned as Secondary bands (or secondary BSSs). Operating channels in each band/BSS may vary in bandwidth and may be further made up of one primary 20 MHz channel and one or more secondary channels. The Primary band may also be known as the Anchor band or Control band or Management band etc. It is also possible that the Primary band is not explicitly assigned, but is implicitly identified as the frequency band on which an Anchor channel is defined.

By default, the Primary band may be the one used by a STA to associate with the AP or the Primary band may be assigned by the AP during or right after association (different STAs may be assigned different Primary bands). By default, STAs are expected to communicate with the AP in the Primary band. The channels on the Primary band is used for Synchronization (i.e. to receive Beacon frames), exchange of management frames, etc. Since the primary band is used to carry important control and management frames, a band with good quality channels (having least interference, no spectrum sharing etc.) with little probability of service disruption (e.g. non-DFS) is chosen as the primary band.

The Secondary bands may be primarily used to boost throughput for data frames. The Secondary bands may be assigned by the AP during or after association. Enhanced distributed channel access (EDCA) transmissions may be disallowed in the Secondary bands for STAs once they are associated with the AP in order to reduce channel access delays. Only scheduled transmissions may be permitted for the STAs on the Secondary bands (for example through Resource Unit (RU) allocation in Trigger frames).

If a STA is capable of operating in the MB Power Save mode (the MB Power Save capability bit 406 in the multi-band capability element 400 is set), and the STA is operating in the Active power management (PM) mode, it may enable the Primary band and disable the Secondary bands immediately after completing configuration of the bands.

Referring back to FIG. 1, in an example embodiment, STA1 120A is a concurrent tri-band STA operating on 2.4 GHz, 5 GHz, and 6 GHz—the Primary band is 2.4 GHz, the first Secondary band is 5 GHz and the second Secondary band is 6 GHz. STA2 120B is a concurrent dual-band STA operating on 2.4 GHz and 5 GHz—the Primary band is 2.4 GHz and the Secondary band is 5 GHz. STA3 120C is a non-concurrent tri-band STA operating on 2.4 GHz, 5 GHz, and 6 GHz (only a single band is active at any one time)—the Primary band is 2.4 GHz, the first Secondary band is 6 GHz and the second Secondary band is 5 GHz.

Figure 2:
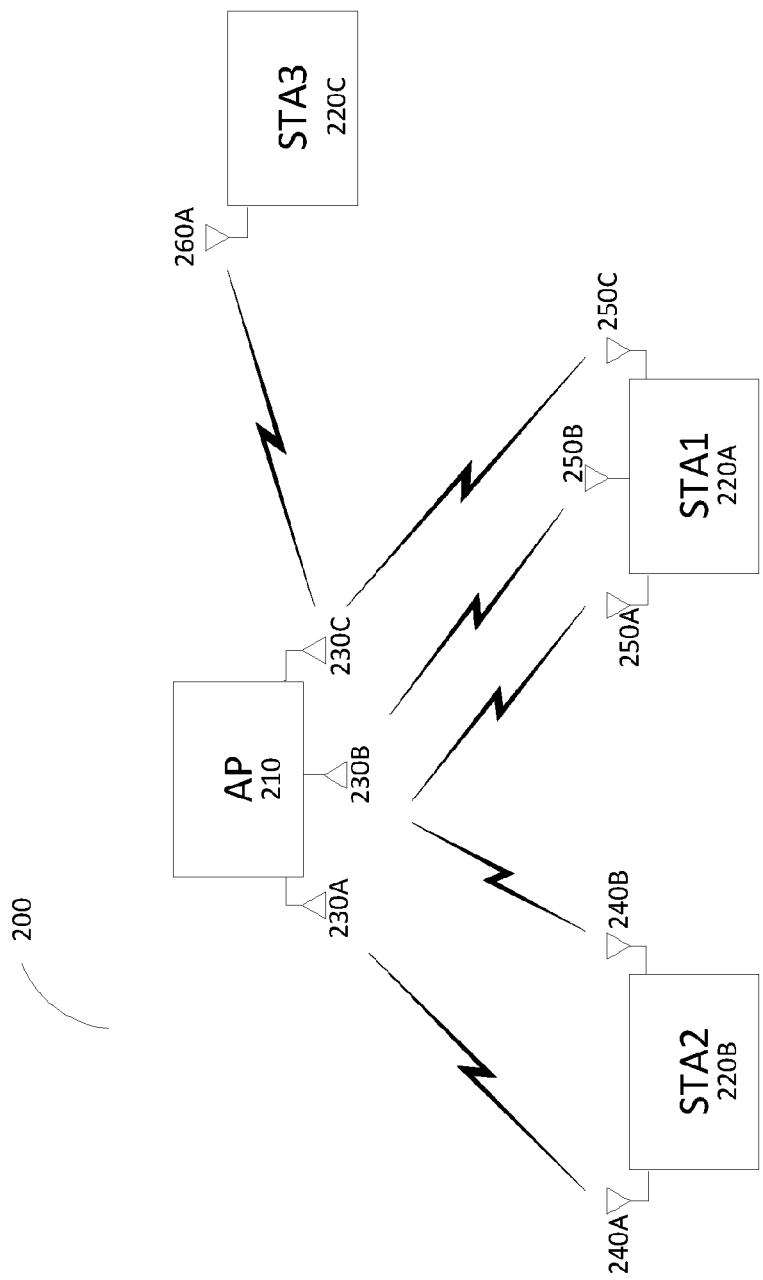
FIG. 2 shows a multi-band wireless network in which a multi-band communication device with a wireless transmitter/receiver operates over multiple different frequency bands with multi-band communication devices.

FIG. 2 shows a multi-band wireless network 200 in which a multi-band communication device with a wireless transmitter/receiver 210 operates over multiple different frequency bands with multi-band communication devices 220A, 220B and 220C. By way of example, the multi-band communication device 210 is shown as an AP with three radios 230A, 230B, and 230C. The multi-band communication devices are shown as STA1 220A with three radios 250A, 250B, and 250C, STA2 220B with two radios 240A and 240B and STA3 220C with one radio 260A. Although multi-band capable APs are fairly common, multi-band capable STAs are not so common and even the few STAs that operate on multiple bands typically only communicate on one frequency band at a time. Concurrent communication (either transmit or receive or both) on multiple channels on different frequency bands may be referred to as multi-band communication and is an effective means of dramatically increasing the transmission throughput.

Consider an example in which AP 210 is a concurrent Tri-band capable AP (2.4 GHz, 5 GHz, and 6 GHz); STA1 220A is a concurrent Tri-band capable STA (2.4 GHz, 5 GHz, and 6 GHz); STA2 220B is a concurrent dual-band capable STA (5 GHz and 6 GHz); and STA3 220C is a non-concurrent Tri-band capable STA (2.4 GHz, 5 GHz, or 6 GHz). Each radio (e.g. 240A, 240B, 250A, 250B, 250C) may operate on a particular frequency band. Although a single antenna is shown per radio, in reality each of the radios may comprise of multiple physical antennas that are used for MIMO, MU-MIMO, etc.

Figure 3:
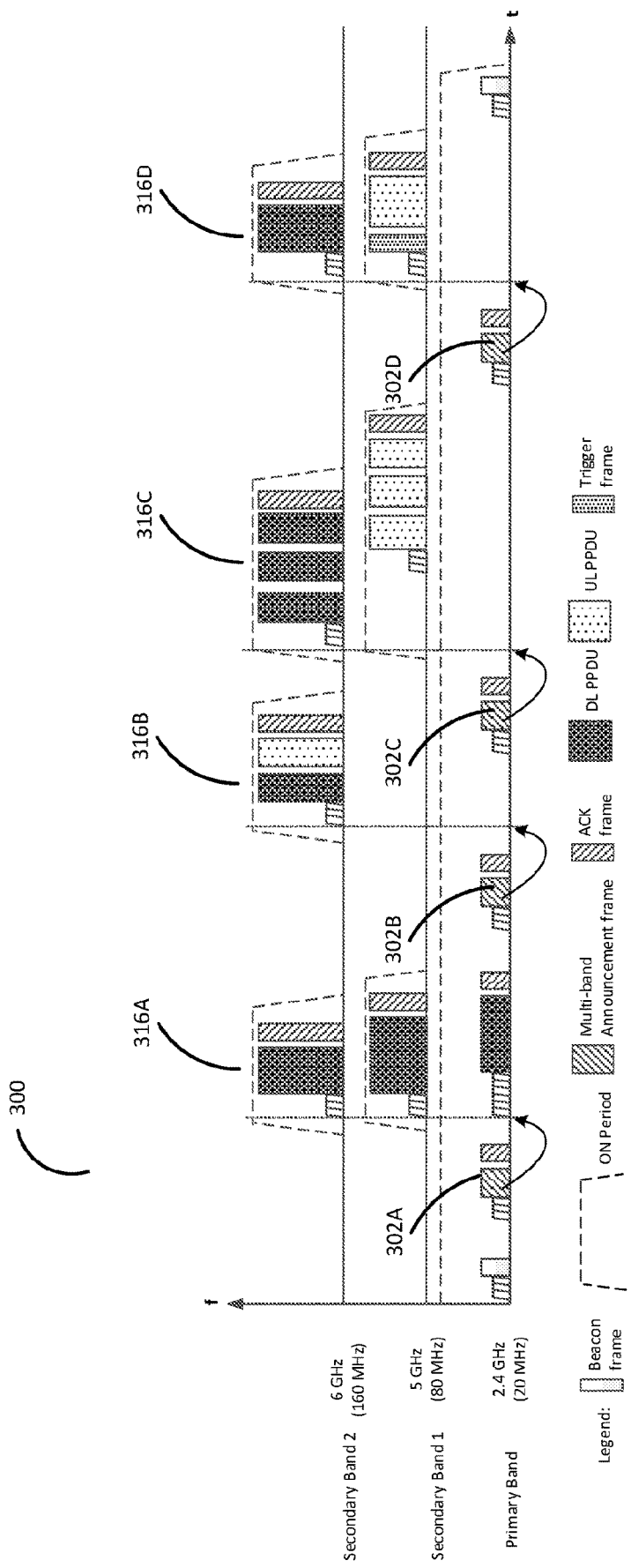
FIG. 3 illustrates an exemplary multi-band transmission to a STA that is in an active mode, according to an example embodiment.

FIG. 3 illustrates an exemplary multi-band transmission to a STA that is in an active mode, according to an example embodiment. 2.4 GHz band has been assigned as Primary band for all 3 STAs, while 5 and 6 GHz bands are assigned as Secondary band 1 and Secondary band 2 respectively. In this example, all 3 STAs are operating on Active mode (i.e. not in Power Save mode) and all 3 STAs have their radio activated on the Primary band, but their radios on the Secondary bands are deactivated (the definition of "deactivated" may be implementation specific with some choosing to completely turn off the secondary radios to save power, while some may put their secondary radios in shallow sleep mode to facilitate faster activation time).

Specifically, STA1 is a concurrent tri-band STA operating on 2.4 GHz, 5 GHz, and 6 GHz—the Primary band is 2.4 GHz, the first Secondary band is 5 GHz and the second Secondary band is 6 GHz. STA2 is a concurrent dual-band STA operating on 2.4 GHz and 5 GHz—the Primary band is 2.4 GHz and the Secondary band is 5 GHz. STA3 is a non-concurrent tri-band STA operating on 2.4 GHz, 5 GHz, and 6 GHz (only a single band is active at any one time)—the Primary band is 2.4 GHz, the first Secondary band is 6 GHz and the second Secondary band is 5 GHz.

The AP uses the Primary band to indicate an upcoming multi-band transmission (downlink (DL) or uplink (UL)). Specifically, a management frame (hereinafter referred to as "multi-band announcement frame") is defined that carries information such as the transmission time, band information, target STAs, etc. When the AP intends to initiate a multi-band transmission to one or more STA, it first needs to ensure that all the addressed STAs have their radios activated on all the frequency bands involved in the multi-band transmission. Also, depending on the implementation, the activation time for the radios may not be trivial. As such, in order to give the STAs enough time to activate their radios on the secondary band, the AP factors the activation time when scheduling the multi-band announcement frame for transmission. Since there is no restriction on EDCA channel access for STAs on the Primary band, the AP also factors the time required to gain access to the channel (CSMA/CA backoffs etc.). In order to prioritize the transmission of the multi-band announcement frame, the AP may use the highest Access Category (AC_VO) for such transmissions.

The AP schedules the multi-band transmission at the transmission time indicated in the multi-band announcement frame. For the AP there are no changes to channel access rules, resource unit (RU) allocation rules, etc. on the secondary bands in this example.

Upon reception of a multi-band announcement frame, the addressed STA: acknowledges (ACKs) the multi-band announcement frame and enables the indicated Secondary band/s before the indicated Transmission Time (e.g. activate radios and related circuitries on the Secondary bands if needed, etc.). The STA may also listen to the Secondary band earlier and set network allocation vectors (NAVs) if required. The STA disables the Secondary bands (i.e. switch back to the Primary band) immediately after completion of the frame exchange sequence (TXOP) on the band or if no DL frame is received for a pre-determined timeout value. The pre-determined timeout value may be implementation specific but large enough to factor in the average channel access delays.

In FIG. 3, the multi-band announcement frames are designated reference numerals 302A/302B/302C/302D. The AP indicates an upcoming multi-band transmission TXOP (Transmission Opportunity) by transmitting multi-band (MB) Announcement frame 302A/302B/302C/302D on the Primary band. Upon receiving the MB Announcement frame 302A/302B/302C/302D, if a receiving STA finds its STA ID in the frame, it activates its radios on the indicated Secondary bands before the indicated Transmission Time. The Secondary bands are expected to be activated at least to complete the DL or UL TXOP, or for the duration of a predetermined timeout value (in case no transmission is received).

The MB Announcement frame 302A signals the multi-band transmission 316A (DL to STA1 on all 3 bands). The MB Announcement frame 302B signals the multi-band transmission 316B (not restricted i.e. DL/UL to STA3 on Secondary band 2). 316B may be a cascading OFDMA transmission (i.e. DL PPDU followed immediately by Uplink PPDU). 316B may be considered a special case of multi-band transmission where transmission occurs on a single Secondary band. The MB Announcement frame 302C signals the multi-band transmission 316C (DL to STA2 on Secondary Band 2 and UL from STA2 on Secondary Band 1). 302C is an example of scheduling UL/DL band separation to enable Frequency Division Duplexing (FDD). It is to be noted that 302C has given explicit permission in this case to STA2 to allow the EDCA UL transmission on Secondary Band 1 (i.e. it is not scheduled by the AP as there is no Trigger frame transmission by the AP). Here there may be a burst of transmissions separated by SIFS in both DL and UL. For example, the UL transmission from STA2 on Secondary Band 1 may be upper layer acknowledgments (e.g. TCP ACKs) to the DL transmissions on the Secondary Band 2. The MB Announcement frame 302D signals the multi-band transmission 316D (DL to STA3 on Secondary Band 2 and UL (Triggered) from STA1, STA2 on Secondary Band 1). STA3 being a non-concurrent tri-band STA, it is not available on the Primary band for the duration of the multi-band transmission 316D. It is to be noted that the DL and UL PPDUs may carry simple MPDU (MAC Protocol Data Units), or they may also carry aggregated MPDUs (A-MPDU)s. The PPDUs may be Single User PPDU (SU-PPDU) i.e. only carry frames addressed to a single STA, or they may also be Multi-User PPDU (MU-PPDU) i.e. carry frames addressed to more than one STA. ACK frame also may refer to a single Acknowledgement frame or may also be a Block Ack depending on the preceding PPDU type that is acknowledged, or may even be MU ACKs that carry ACK frames from multiple STAs.

For simplicity, in FIG. 3, Beacon frames are only shown on the Primary Band, but it does not necessarily mean that Beacon frames are not transmitted on other bands. However, multi-band STAs operating in the MB power save mode may choose to only receive Beacon frames on the Primary band. As such, if there are any changes in the operating parameters on the Secondary bands, the AP is expected to inform such STAs on the Primary band. It is also possible that if different STAs are assigned different Primary bands, the STAs only listen to the beacons transmitted on the respective assigned Primary bands and the multi-band announcement frames are also transmitted on the respective Primary bands.

Figure 4:
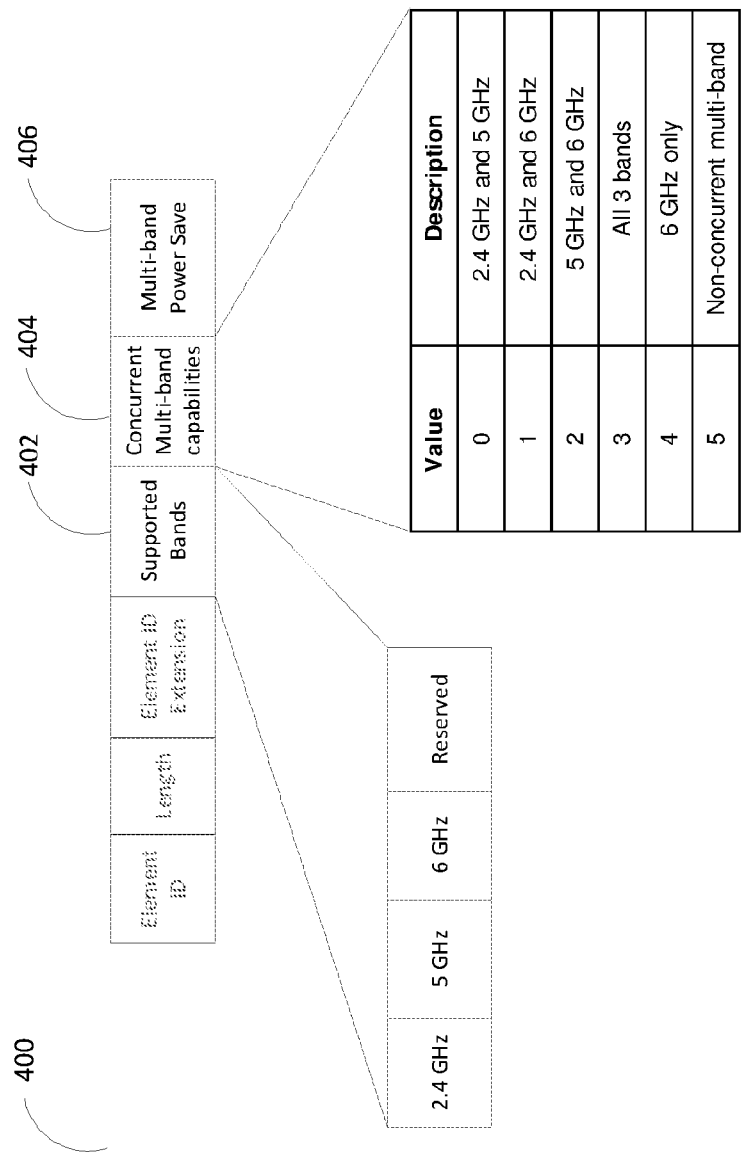
FIG. 4 is an element that advertises multi-band capability.

FIG. 4 is an element 400 that advertises multi-band capability. By way of example, the element 400 may be a multi-band capability element and includes one or more of the following fields: Element ID, Length, Element ID Extension, Supported Bands, Concurrent Multi-band Capabilities, and Multi-band Power Save Option Sub-elements (e.g., Supported Channels, Supported Operating Classes, Power Capability Element, etc.).

The Concurrent Multi-band Capabilities element is included in the Beacon frames, Probe Response frames, Association Response frame, etc. by an AP to advertise its multi-band capabilities. On the other hand, the Concurrent Multi-band Capabilities element is included in the Probe Request frames, Association Request frame by a non-AP STA to indicate its multi-band capabilities.

The Supported Bands bitmap 402 indicates the frequency bands supported by a multi-band device. The Concurrent Multi-band capabilities field 404 indicates the bands that the device is able to concurrently operate on.

In an exemplary implementation, a power save scheme (referred to as "Multi-band Power Save scheme" in this disclosure) is provided for non-AP STAs, wherein a multi-band non-AP STA saves power by operating on a single band by default and only activating the rest of the bands when they are involved in transmission/reception. A multi-band non-AP STA indicates whether it supports Multi-band power save operation in the Multi-band Power Save field 406, whereas a multi-band AP STA indicates whether it provides Multi-band power save operation in the Multi-band Power Save field 406.

Figure 5:
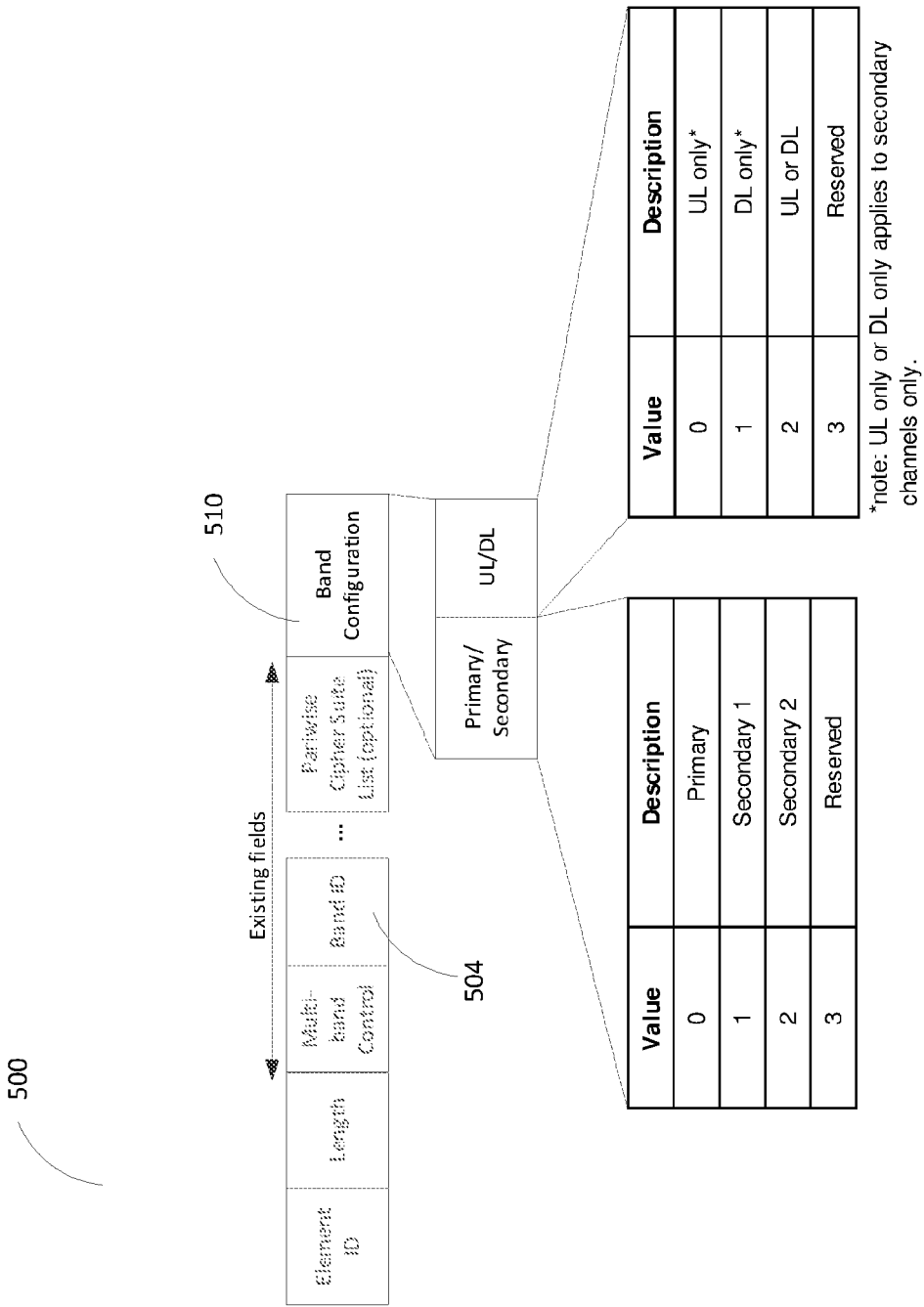
FIG. 5 is an element that is used to signal band configuration information.

FIG. 5 is an element 500 that is used by AP to signal multi-band configuration information to a multi-band STA. By way of example, the element 500 may be a multi-band element and includes one or more of the following fields: Element ID, Length, Multi-band Control, Band ID and Band Configuration. When included in the multi-band element 500 during initial configuration, the Band Configuration field 510 indicates the category assigned to the band identified by the Band ID field 504. The AP may include one or more multi-band elements 500 in the Association Response frame or other management frames to configure Primary/Secondary bands of a STA. The UL/DL field may be used to indicate the default restrictions on a band, for example uplink only, or downlink only or no restrictions. When included in the multi-band announcement frame, the Band Configuration field 510 is only used to identify the band (Primary or Secondary 1 or Secondary 2) but the UL/DL field may be used to override the default UL/DL configurations of a band.

In multi-band BSSs in which the AP maintains a separate BSS on each frequency band, the word band and BSS may be used interchangeably e.g. 2.4 GHz band also refers to the BSS on the 2.4 GHz band. Once the bands/BSS have been configured, the encoding used for Primary/Secondary field may also be used to refer to the band/BSS in subsequent frame exchanges, e.g. 0 is used to refer the 2.4 GHz band/BSS assigned as the Primary band/BSS, etc.

Since the Primary band is used to carry important control and management frames, a band with good quality channels (having least interference, no spectrum sharing, etc.) with little probability of service disruption should be chosen as the Primary band. Although it is possible for the AP to assign different Primary bands to different STA (e.g. for load balancing), in most deployments it is expected that all STAs are assigned to the same Primary band for ease of operation.

Also, during normal operation it is expected that the Primary/Secondary configuration endures for the lifetime of the BSSs, however under special circumstances (such as unexpected worsening of the channel conditions on the Primary band), the AP may change the band configuration of the STAs by transmitting frames carrying the element 500 to the STAs. When the configurations of all the associated STAs need to be changed, the element 500 may also be advertised in broadcast frames such as Beacon frames.

Figure 6:
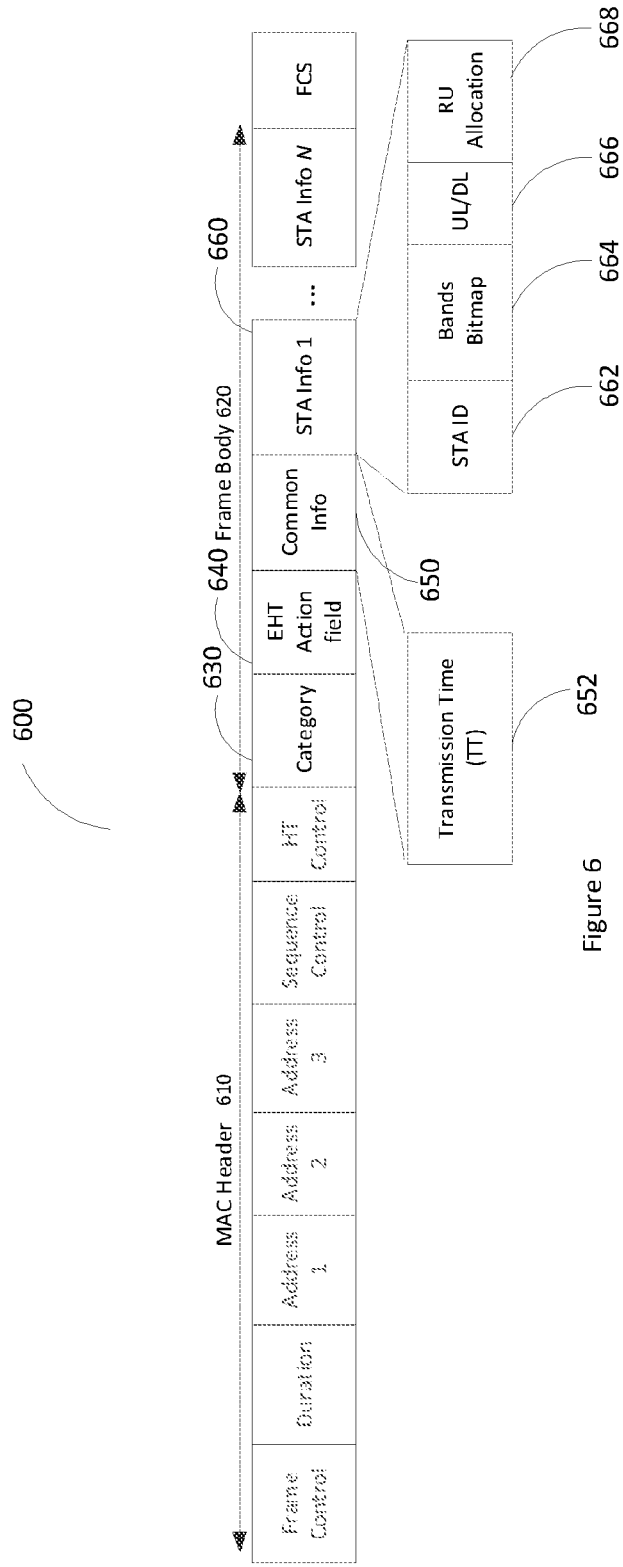
FIG. 6 shows a multi-band announcement frame, according to an example embodiment.

FIG. 6 shows a multi-band (MB) announcement frame 600 as an Action frame, according to an example embodiment. The frame 600 includes a MAC Header 610 with one or more of the following fields: Frame Control, Duration, Address 1, Address 2, Address 3, Sequence Control, and HT Control. The frame 600 further includes a frame body 620 with one or more of the following fields: Category, EHT Action, Common Info, STA Info (there can be one or more such fields—STA Info 1, STA Info 2, . . . , STA Info N) and FCS.

The Category field 630 can be set to a value that indicates EHT Action frame. The EHT Action field 640 can be set to a value that indicates Multi-band Announcement Action frame. The Common Info field 650 can include a Transmission time (TT) field 652 that indicates the time at which the transmission is expected to start at the indicated band(s). The STA Info field (e.g. STA Info 1 field 660) can include the following sub-fields: (i) STA ID 662—identifies the STA involved in the transmission (e.g. AID12 of the STA); (ii) Band Bitmap 664—identifies the frequency bands for transmission (e.g. 3 bits bitmap, 1 bit per frequency band); (iii) UL/DL—indicates whether the transmission is for UL (non-triggered) if allowed or for DL or not restricted; (iv) RU Allocation 668—OFDMA RU to be used to transmit the UL MU ACK frame in response to the Multi-band Announcement frame addressing multiple STAs, Reserved otherwise.

The MB-Announcement frame may be transmitted on its own, or may be aggregated with Data or management frames. When transmitted on its own, the highest AC (e.g. AC_VO) may be used for its channel access.

The advantageous effects of using the multi-band announcement frame 600 include power saving for STAs by using multi-band only as needed and minimal changes to baseline behavior on each band.

Multi-Band Announcement Frame with "Active Duration"

In one alternative implementation, the multi-band announcement frame also indicates "Active Duration", which is the duration that a STA should activate a Secondary band. The "Active Duration" may be beneficial for bursty traffic with predictable bursts. The STA keeps the Secondary band active during the "Active Duration". Single-band STAs may only listen to the Secondary band during "Active Duration". Multi-band DL transmission to a single STA may also be synchronized (start and end at same time). If the Backoff counter reaches 0 on any one band, as long as the channel is idle for Arbitration Inter-frame Space (AIFS) prior to that time on the other bands, DL transmission is allowed on the band. Data is distributed across bands such that all transmission ends at the same time.

Figure 7:
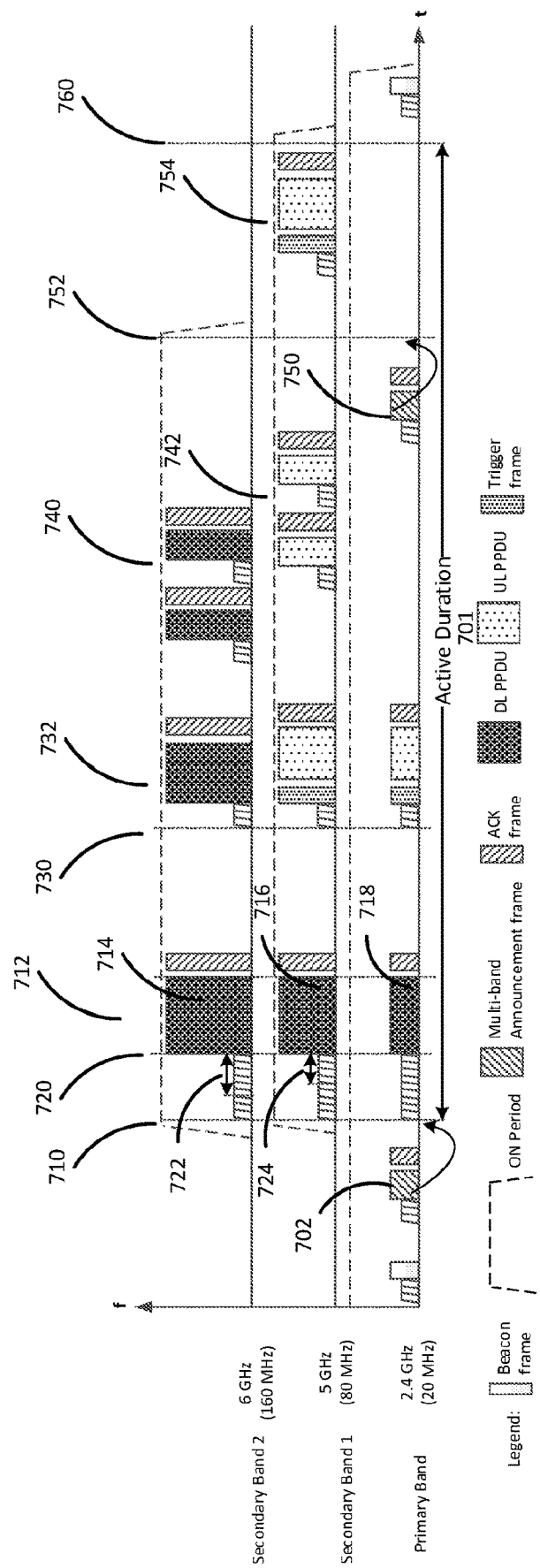
FIG. 7 illustrates an exemplary multi-band transmission to STAs, according to an example embodiment.

Multiple multi-band transmission opportunities (TXOP) may take place during the "Active Duration". The AP may also terminate the "Active Duration" early if required. FIG. 7 illustrates an exemplary multi-band transmission to STAs, according to an example embodiment. With reference to FIG. 7, the "Active Duration" is designated reference numeral 701. The AP does not indicate every upcoming multi-band transmission TXOP by transmitting a MB Announcement frame on the Primary band. Rather, the AP uses the MB Announcement frame 702 to indicate to STAs the Active Duration, starting at the Start Time 710, during which the STAs are expected to keep their radio of the Secondary bands activated. The MB Announcement frame 702 may also override the default UL/DL configuration of the bands during this period, for example restricting Secondary band 2 to DL only, while allowing both DL and UL in Secondary band 1. The main benefit is that multiple transmissions can be scheduled during this duration over all active bands and may be useful when the AP has good knowledge about the traffic pattern (e.g. for streaming video).

At time 710, AP schedules the multi-band DL transmission 712 to STA1 made up of DL PPDUs 714, 716 and 718, which happens to be synchronized in time, i.e. the multi-band transmission starts and ends at the same time on all three bands. To achieve this, the 802.11 EDCA channel access rules may need to be modified. The AP starts contending for channel on all three bands by performing CSMA/CA channel access on the primary 20 MHz channel of each band which involves ensuring the primary 20 MHz channel of each band is idle for a duration of Access Category (AC) specific AIFS+a random number of backoff slots (as determined by the Backoff Counter). Assuming that the Backoff Counter of the primary 20 MHz channel of the Primary band reaches 0 first at time 720, in order to start the multi-band transmission on the other bands, the AP only needs to ensure that the primary 20 MHz channel of the other bands were idle for a duration of AIFS corresponding to the primary AC of the frames to be transmitted on that band, prior to that time. The rules to include secondary channels on any band remain unchanged, i.e. the secondary channels only need to be idle for PIFS to be considered eligible for inclusion in a wide band transmission. So, if the AC of the frames in PPDU 716 is AC_VO, the primary 20 MHz channel on the Secondary band 1 needs to be idle for AIFS[AC_VO] 724=AIFSN[AC_VO]×aSlotTime+aSIFSTime, prior to time 720. Similarly, if the AC of the frames in PPDU 714 is AC_VI, the primary 20 MHz channel on the Secondary band 2 needs to be idle for AIFS[AC_VI] 722=AIFSN[AC_VI]×aSlotTime+aSIFSTime, prior to time 720. In the event that the primary 20 MHz channels on any of the band is not idle for the required duration, the band is not considered for the multi-band transmission. Synchronized transmission over multiple frequency bands may be considered as Physical layer (PHY) aggregation and the multi-band transmission may be carried in a multi-band PHY Protocol Data Unit (PPDU). A multi-band PPDU may be identified by an explicit field in the PHY header as a distinct PPDU type, or it may be implicitly identified, for example by a bandwidth field that spans over multiple frequency bands. Also, in the event that transmission of a multi-band PPDU fails in any one of the bands, even if transmission is successful in the other bands, the transmission of the multi-band PPDU is considered as failed and the Contention Windows (CW) for the AC is doubled in all involved bands (until it reaches CWmax). Only if the transmission on all bands is successful, the Contention Windows (CW) for the AC is reset to CWmin.

Subsequently, at time 730 the AP schedules the multi-band transmission 732 which involves a DL PPDU to STA 3 on Secondary band 2, and scheduled UL PPDUs from STA2 and STAT on Secondary band 1 and Primary band, respectively. The scheduled UL PPDUs are signaled by the AP by transmitting Trigger frames on the respective bands.

Using this signaling method, the AP is also able to support FDD transmission to STA2 made up of the DL transmission 740 on Secondary band 2 and the corresponding UL transmission 742 on Secondary band 1. Here, the UL transmission 742 may be upper layer acknowledgments (e.g. TCP ACKs) to the DL transmissions 740. The main difference versus the FDD transmission 316C (see FIG. 3) is that both the DL and UL transmissions are not limited to a single TXOP and may span over multiple TXOPs.

Once the AP has completed the transmission of all DL frames, it may transmit the MB announcement frame 750 with the Active Duration field 820 (see FIG. 8) corresponding to the Secondary band 2 set to 0 to allow the STAs to deactivate the band at time 752.

Finally, after completing the scheduled UL transmission 754, all STAs deactivate the Secondary band 1 at time 760, the end of the Active Duration. Although this example shows the same Active Duration value for all the Secondary bands, the AP may also customize the Active Duration value for individual Secondary bands. STAs that are not included in the MB-announcement frame 702 can continue to only operate on the Primary band and may continue to keep their radios on the Secondary bands deactivated.

Figure 8:
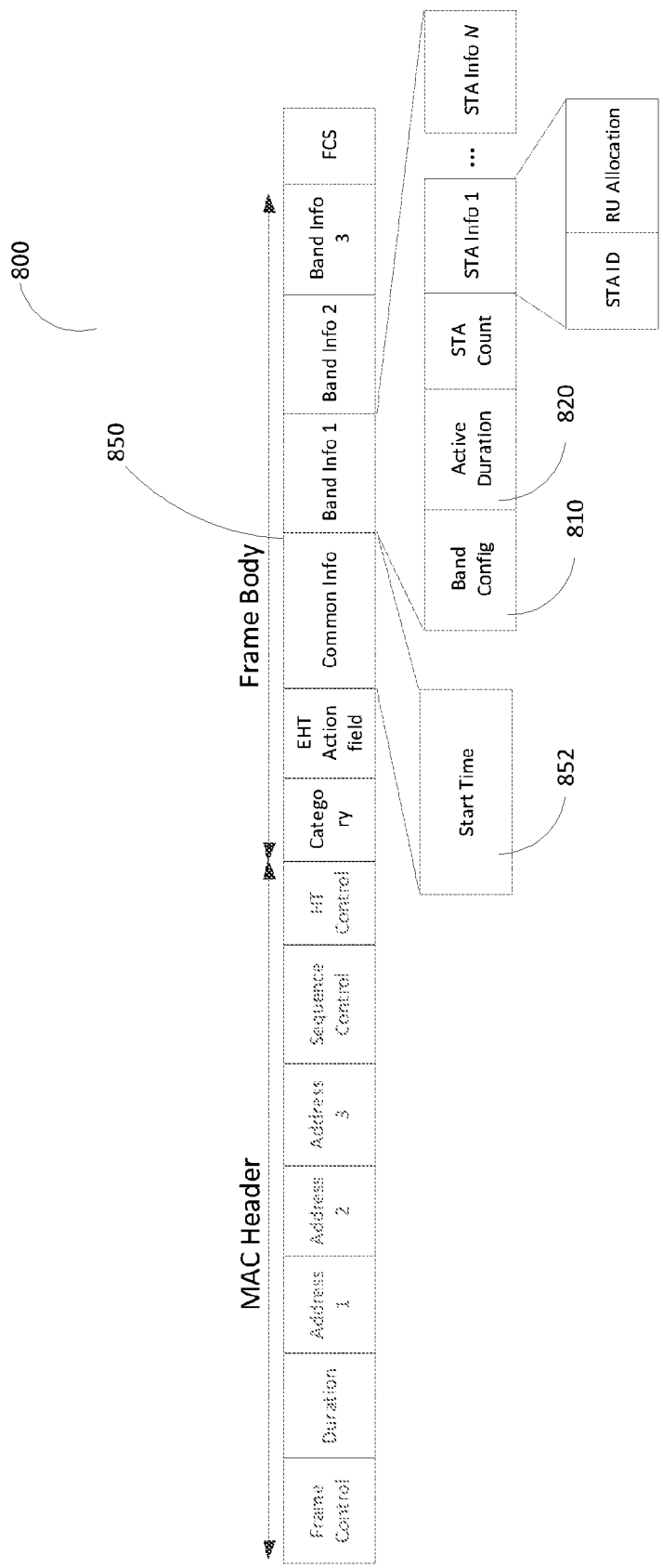
FIG. 8 shows a multi-band announcement frame, according to an example embodiment.

FIG. 8 shows a multi-band announcement frame 800, according to an example embodiment. One advantageous effect of using the multi-band announcement frame 800 is that information is arranged according to frequency bands. The frame 800 includes a Common Info field 850 that comprises a Start Time field 852 which indicates the time at which the Secondary bands are expected to be active. The frame 800 further includes one or more Band Info fields (e.g. Band Info 1, Band Info 2, Band Info 3). Each Band Info field includes one or more of the following sub-fields related to a particular band: (i) Band Config; (ii) Active Duration; (iii) STA Count; and (iv) STA Info. The Band Config 810 sub-field may be same as the Band Configuration field 510 (see FIG. 5) and identifies the frequency band (Primary or Secondary) for transmission as well as UL/DL restrictions for the band, if any.

The Active Duration sub-field 820 indicates the duration that a STA included in that Band Info field should activate the band identified by the Band Config field 810. This may be set to 0 to indicate early termination of an ongoing Active Duration for the band. This information may also be used by neighboring APs receiving the Multi-band Announcement frame to perform co-operative scheduling of traffic on the band.

The STA Count sub-field indicates the number of STAs allocated for transmission on this band.

There can be one or more STA Info sub-fields, and each sub-field can include further sub-fields: (a) STA ID and (b) RU Allocation. STA ID identifies the STA involved in the transmission (e.g. AID12).

For RU Allocation, OFDMA RU to be used to transmit the UL MU ACK frame in response to the Multi-band Announcement frame addressing multiple STAs; reserved otherwise.

In the multi-band announcement frame 800, the main difference is that the information is arranged by bands; and the duration that a STA should activate the Secondary bands is explicitly signaled by the AP in the Active Duration field 820, thereby allowing multiple multi-band transmission TXOPs during each active duration.

Multi-Band Transmission for a STA Indicated within a Non-Dedicated Frame

Figure 9:
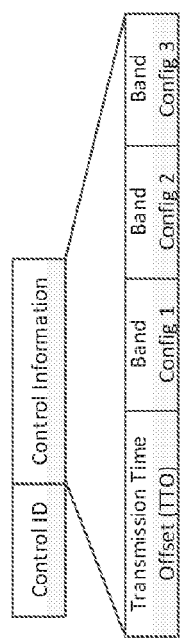
FIG. 9 is a multi-band control field that includes a number of sub-fields and may be used to signal an upcoming multi-band transmission to a STA.

In another alternative implementation, instead of using a dedicated frame, an upcoming multi-band transmission for a STA is indicated within another frame transmitted to the STA (in any band). For example, an multi-band A-Control field (MB-Control) is defined (for example using a reserved Control ID value of High Efficiency (HE) A-Control field). Any active band may be used to indicate an upcoming multi-band transmission. A Multi-User (MU) PPDU may carry more than one MB-Control field (maximum one per user). One advantageous effect of this alternative implementation is that multi-band related control signal overhead is further reduced. FIG. 9 is a multi-band A-Control field that includes one or more of the following fields: Control ID and Control Information. The Control Information field comprises one or more of the following sub-fields: (i) Transmission Time Offset (TTO); (ii) Band Config. The TTO field indicates the time offset at which the transmission is expected to start at the indicated band/s. If set to 0, transmission time is implicitly set as SIFS+the end of the ACK to the frame carrying the A-control field. There can be one or more Band Config fields, each field identifies the frequency band for transmission as well as UL/DL restrictions for the band, if any. The MB-Control field may be carried within data frames as well as management frames (unicast) and signals information about upcoming multi-band transmission to the STA addressed in the host frame.

Figure 10:
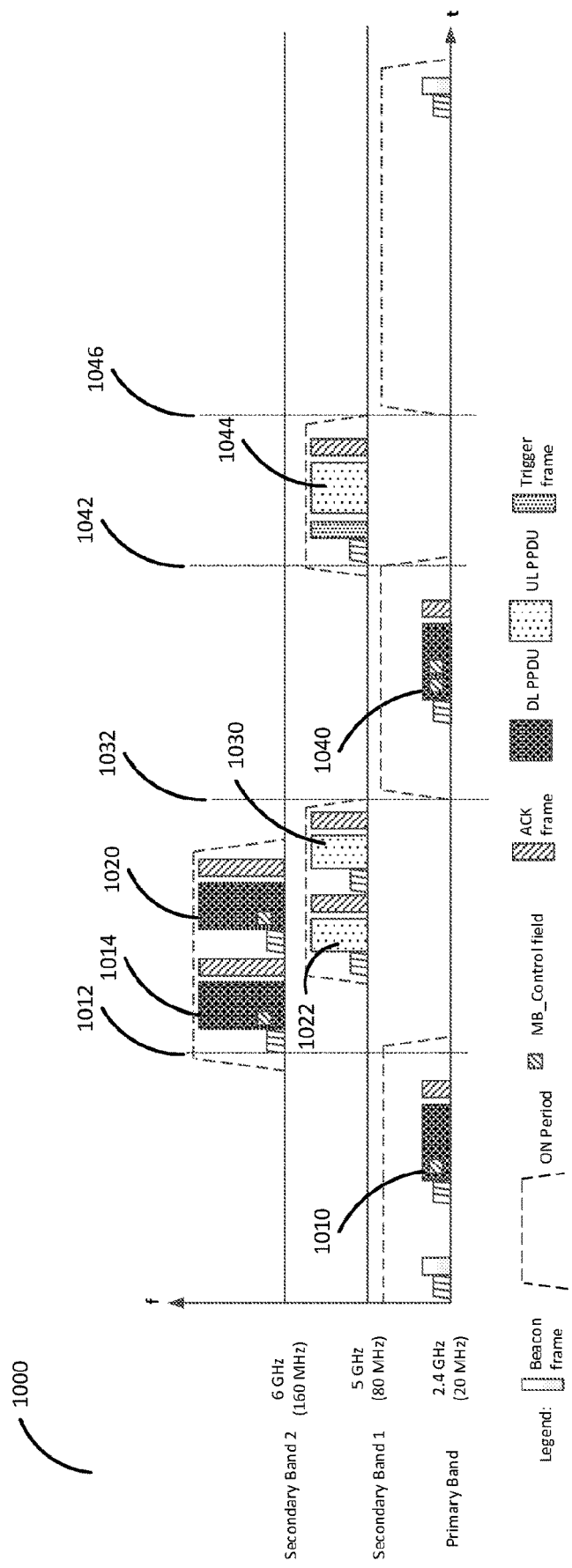
FIG. 10 illustrates an exemplary multi-band transmission to STAs, according to an embodiment.

Alternatively, the Control Information may also be carried in a new MB-Control element defined for the purpose. However, in this case the MB-Control information may only be carried within management frames. FIG. 10 illustrates an exemplary multi-band transmission to STAs, according to this alternative embodiment. DL PPDU 1010 transmitted on the Primary band and addressed to STA1 carries a MB-control frame that schedules a DL transmission on Secondary Band 2 at time 1012. STA1 activates the Secondary band 2 before time 1012, in time to receive DL PPDU 1014. At this time, if no other frames are expected from the AP, STA1 may even deactivate the radio on the Primary band to further save power. The DL PPDU 1014 carries a MB-Control field that schedules Secondary band 2 for another DL transmission and Secondary band 1 for UL transmission. As such, STA1 continues to activate Secondary band 2 to receive the DL PPDU 1020 and also activates Secondary band 1 to transmit the UL PPDU 1022. The DL PPDU 1020 carries the MB-Control field that schedules the Secondary band 1 for another UL transmission and hence STA1 continues to activate Secondary band 1 while it deactivates the Secondary band 2 since no more transmissions are scheduled on it. Upon completing the UL transmission of UL PPDU 1030, STA1 deactivates the Secondary band 1 and activates the Primary band. Subsequently a MU DL PPDU 1040 carrying DL frames to STA1 and STA2 is transmitted by the AP. PPDU 1040 also carries two MB-Control fields that schedules the Secondary band 1 for triggered multi-use (MU) uplink transmissions from STA1 and STA2 at time 1042. At time 1042, STA1 and STA2 activate the radios on the Secondary band 1 to wait for the trigger frame from the AP and may also deactivate the radio on the Primary band. Upon transmitting the respective UL PPDUs 1044, at time 1046 STA1 and STA2 deactivate the radios on the Secondary band 1 and reactivate the radio on the Primary band.

Multi-Band Power Save Frame

Figure 11:
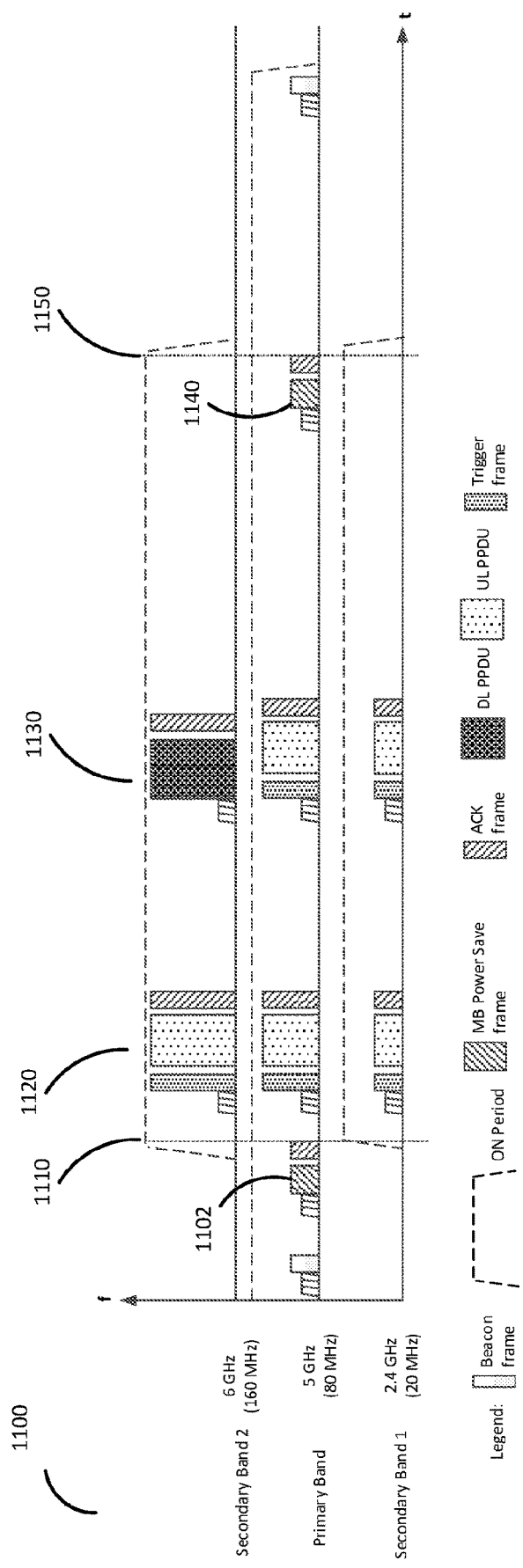
FIG. 11 illustrates an exemplary multi-band transmission, according to an embodiment.

In yet another alternative implementation, the enabling/disabling of Secondary bands is initiated by non-AP STAs. When a STA has uplink data in its buffer for transmission to the AP, it may be a better position to decide the timing for multi-band transmissions; in such cases it may be more practical for the enabling/disabling of Secondary bands to be initiated by non-AP STAs. The STA initiates the enabling/disabling of Secondary bands and reports to the AP using the MB Power Save frame. The Secondary bands remain enabled/disabled until another MB Power Save frame is transmitted. The Primary band is always active. FIG. 11 illustrates an exemplary multi-band transmission, according to this alternative embodiment. In FIG. 11, the 5 GHz band has been configured as the Primary band for the STA while the 2.4 GHz and 6 GHz bands are Secondary bands. When the STA has a large UL traffic in its buffer, it may wish to utilize multi-band transmission and to do so, it may activate its Secondary bands and report the new status to the AP by transmitting the MB Power Save frame 1102, which may also report the UL buffer status of the STA. The STA is expected to have its radio on the Secondary bands activated by time 1110 at the latest, after it has received the ACK frame to the first MB Power save frame. The STA goes on to engage in multi-band transmissions 1120 and 1130 before transmitting another MB Power Save frame 1140 to indicate its intention to deactivate the Secondary bands. At time 1150, upon receiving the ACK frame to the second MB Power Save frame 1140, the STA may proceed to deactivate the Secondary bands.

Figures 12A, 12B:
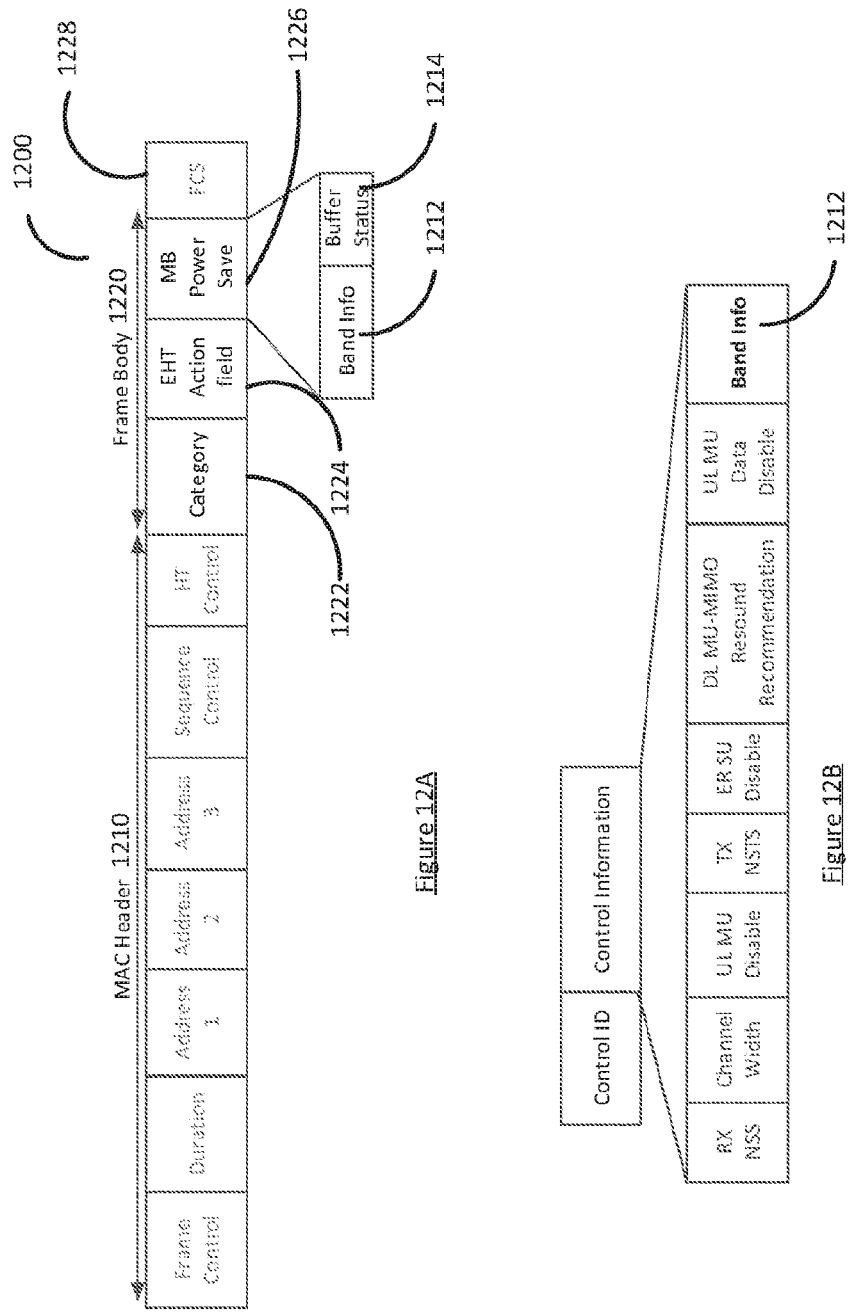
FIG. 12A shows a multi-band (MB) Power Save frame used by a STA to report the status of its bands to the AP, according to an example embodiment.
FIG. 12B shows a format of a MB Operating Mode (OM) control field that may be alternatively used by the STA.

FIG. 12A shows a multi-band (MB) Power Save frame 1200 used by a STA to report the status of its bands to the AP, according to an example embodiment. One advantageous effect of this embodiment is more control for STAs. The frame 1200 includes a MAC Header 1210 with one or more of the following fields: Frame Control, Duration, Address 1, Address 2, Address 3, Sequence Control, and HT Control. The frame 1200 further includes a frame body 1220 with one or more of the following fields: Category, EHT Action, MB Power Save and FCS. The Category field 1222 is set to a value that indicates EHT Action frame. The EHT Action field 1224 is set to a value that indicates MB Power Save. The MB Power Save field 1226 comprises two sub-fields: (a) Band Info and (b) Buffer Status. The Band Info sub-field 1212 identifies the status of frequency bands (e.g. 3 bits bitmap, 1 bit per frequency band, 1=enable; 0=disable). For the Buffer Status sub-field 1214, the STA may also report the status of its buffer to the AP in order to help the AP to schedule uplink resource assignments.

Alternatively, the STA may also include a Multi-band Operating Mode (OM) Control field in a valid UL frame to indicate the changes in the band status to the AP. FIG. 12B shows the format of the MB Operating Mode (OM) control field that may be alternatively used by the STA (by including in any valid UL frame) to achieve the same result. One advantageous effect of this embodiment is more control for STAs.

Power Save (PS) Power Management Mode

In the preceding description, it was assumed that the multi-band STAs were operating in the Active Power Management mode, where the radio in the Primary band is always activated in most cases. However, in an alternative implementation, it is possible that the STAs may operate in the Power Save (PS) Power Management mode, where even the radio of the Primary band may be in a Doze state most of the time and only moves to an Awake state to receive and transmit frames. Although it is simpler if the Awake and Doze states of radio of all bands of a multi-band STA operating in PS mode operate in a synchronized manner (i.e. all bands transition to the Awake state or Doze state at the same time); however, from power saving point of view, it is better if each band can change the Awake and Doze states independently.

Option 1—Using Legacy Power Save (PS) Mode

Figure 13:
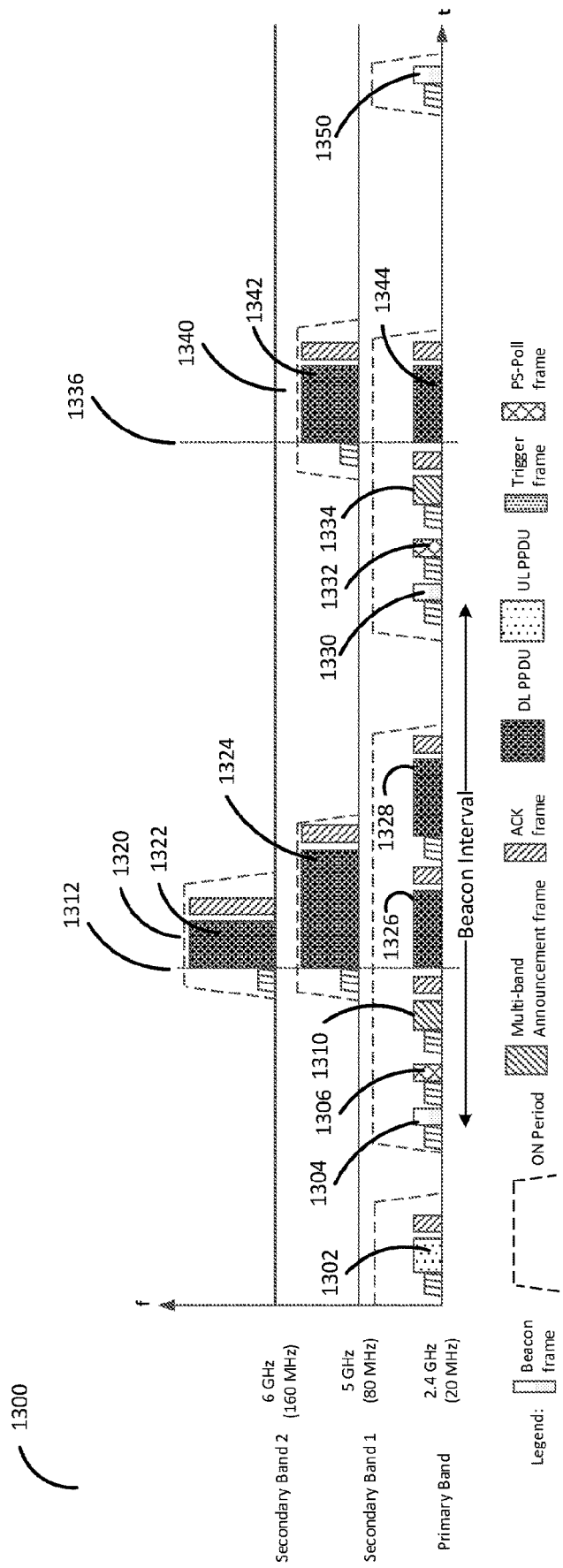
FIG. 13 illustrates an exemplary multi-band transmission to STAs, according to an example embodiment.

This is an example where the Multi-band Power Save operation is used together with the legacy PS mode. FIG. 13 illustrates an exemplary multi-band transmission to STAs, according to an example embodiment. In order to inform the AP that it is switching to PS mode, a STA transmits a valid UL frame 1302 with its Power Management (PM) bit in the frame control field set to 1. In the case of multi-band STAs, the PS mode of the STA may apply to all bands, i.e. upon receiving an ACK frame to the UL frame 1302, all the bands may transition to the Doze mode. This makes it easier for the AP to keep track of the Power Management modes of a STA. Alternatively, it is also possible that the PS mode of a STA may be band specific and the STA needs to transmit the PM set to 1 on each band independently to inform the AP of its intention to move that band to the Doze state. In this case an AP needs to keep track of the Power Management modes of each band of a multi-band STA.

At TBTT (Target Beacon Transmission Time), the STA changes the radio of the Primary band to the Awake state to receive the Beacon frame 1304. If the AP has DL traffic buffered for the STA while the STA was in Doze state, the AP will set the bit corresponding to the STA in the TIM (Traffic Indication Map) element in the Beacon. In order to solicit the buffered traffic from the AP, the STA transmits the PS-Poll frame 1306. If the amount of buffered traffic (BU) for the STA is large, the AP may choose to schedule a multi-band transmission to the STA, in which case it transmit the MB Announcement frame 1310, which may be the frame 1400 in FIG. 14 indicating the multi-band transmission 1320 is made up of DL PPDUs 1322, 1324 and 1326. Since the radios in Doze state may be able to transition to the Awake state in a much shorter time (compared to the case where the radio is completely deactivated), for STA operating in PS mode, the Transmission Time field may be set to 0, or not included in the MB Announcement frame, in which case the addressed STAs are expected to be ready for reception at all the indicated bands a fixed duration (e.g. one SIFS/PIFS) after the end of the UL ACK frame transmission. The benefit is that, this allows the AP to immediately start the transmission of the DL PPDU 1326 on the Primary band at time 1312 (SIFS/PIFS after the end of the ACK frame) since it has already won contention on the channel and skip the channel access delay; even in the Secondary bands, if the channels have been idle for AIFS [AC] prior to the time 1312, the transmission may start at time 1312, [AC] here refers to the AC of the frames carried in the PPDUs on the respective band. In the frames carried by the DL PPDU 1326, the AP sets the More Data (MD) bit in the frame control field to 1 to indicate to the STA that the AP has more data to transmit to the STA on the Primary band, as such the STA continues to stay in the Awake state to receive the DL PPDU 1328 in which the MD bit is set to 0 indicating that the AP will not be transmitting more DL PPDUs to the STA on the Primary band, and the STA may then change its radio on the Primary band to the Doze state. Similarly, after receiving the DL PPDUs 1322 and 1324, both carrying MD bit set 0, the STA may change its radios on the respective bands to the Doze state. Alternatively, it is also possible that for simplicity the transition between awake and doze states on the secondary bands are synchronized with the Primary band.

Similarly for Beacon 1330 and multi-band transmission 1340, the above description applies.

The STA's TIM bit is not set in the Beacon frame 1350, and so the STA need not change the radios of the Secondary bands to the Awake state, and can immediately change to the Doze state on the Primary band.

Figure 14:
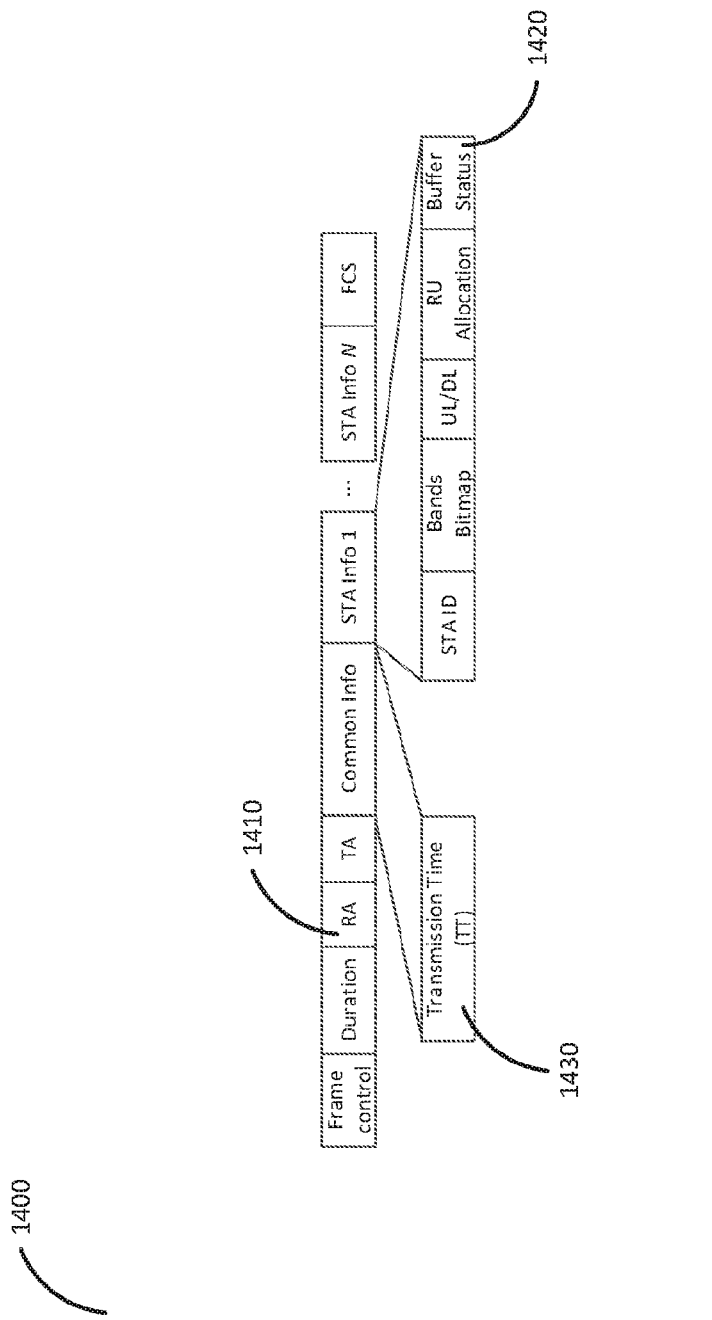
FIG. 14 shows a multi-band announcement frame, according to an example embodiment.

FIG. 14 shows a multi-band announcement frame 1400, according to an example embodiment. While most relevant fields are the same as in the multi-band announcement frame 600 (see FIG. 6) except for the Buffer Status field 1420, the main difference is that multi-band announcement frame 1400 is a Control frame. Control frames are smaller in size and are usually transmitted with a more robust modulation scheme making them more efficient and reliable.

The Receiver Address (RA) field 1410 is set as the broadcast address if more than one STA Info fields are included in the frame, otherwise it is set as the MAC address of the STA signaled in the solo STA Info field. The Buffer Status field 1420 may be used by the AP to indicate the amount of DL traffic stored by the AP for the STA. This information may help the STA to better plan its activation/deactivation of Secondary bands. For example in high DL buffer case, the STA may expect AP to utilize multi-band transmissions more often and may choose to leave the Secondary bands activated for longer duration in anticipation. Another difference from the multi-band announcement frame 600 is that if the Transmission Time (TT) field 1430 is set to 0, or not included in the MB-Announcement frame, the addressed STAs are expected to be ready for reception at all the indicated bands a fixed duration (e.g. one SIFS/DIFS) after the end of the UL ACK frame transmission.

Option 2—Using MB TIM Element & MB PS-Poll Frame

Figure 15:
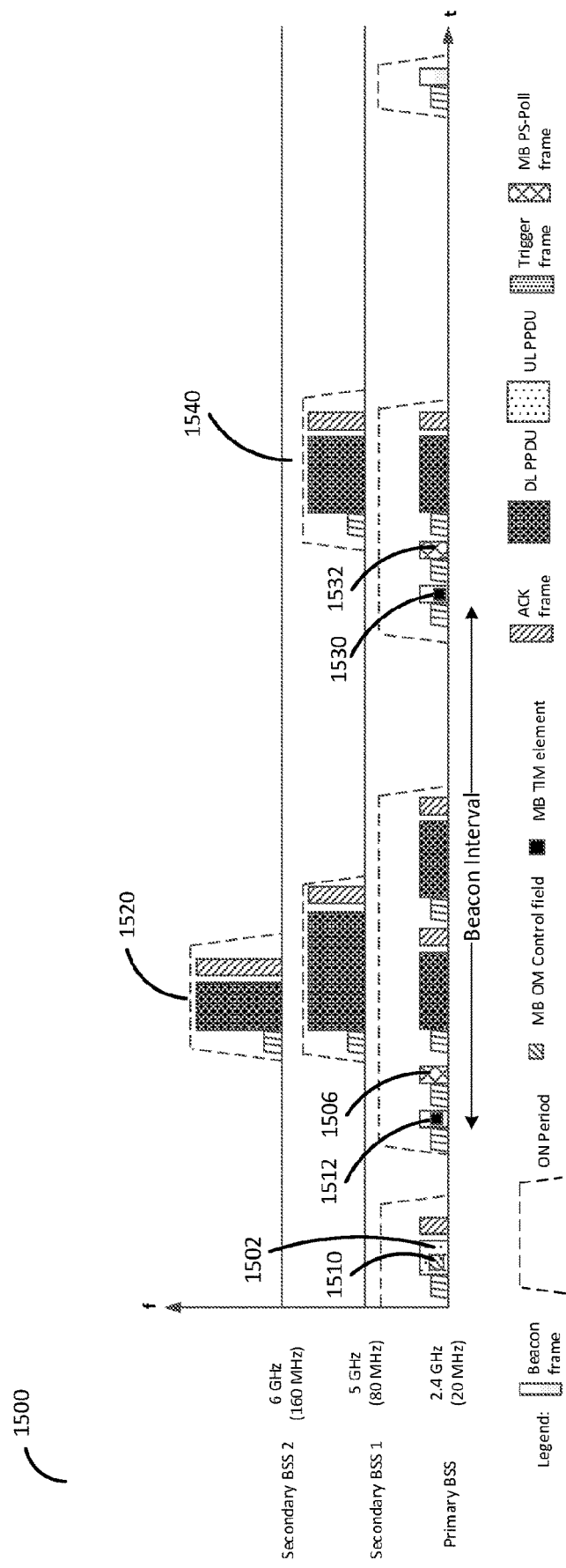
FIG. 15 illustrates an exemplary multi-band transmission to STAs, according to an example embodiment.

FIG. 15 illustrates an exemplary multi-band transmission to STAs, according to an example embodiment. FIG. 15 is similar to the multi-band transmission to STAs shown in FIG. 13, but using a MB TIM element and a MB PS-Poll frame and for the case where the AP operates separate BSSs on different bands, in which case the AP may buffer data for the STAs in each BSS (band) independent from the other BSSs (band). Although it is possible for the AP to indicate the Buffered Units (BUs) for STAs through the TIM element carried in Beacon frames transmitted on respective band, as mentioned earlier, it is advantageous for non-AP STAs to only listen to the Beacon frames transmitted on the Primary BSS (band) to save power.

During the Power Management mode change indication using the UL frame 1502, STA also includes the MB OM Control field 1510 in the frame and uses the Band Info field 1212 (see FIG. 12) to indicate that the STA wishes to change to PS mode in all 3 bands/BSS. Upon receiving the ACK frame, the STA proceeds to move to the doze state on all 3 bands/BSS.

At the TBTT (Target Beacon Transmission Time) of the Primary BSS, the STA changes the radio of the Primary band to the Awake state to receive the Beacon frame of the Primary BSS. Aside from the regular TIM element (to indicate BUs on the Primary BSS), AP also includes two MB TIM elements 1512 in the Beacon frame to indicate that AP has BUs on the 2 Secondary BSSs for the STA, implicitly indicating that it may initiate the multi-band transmission 1520 to the STA. The STA responds by transmitting the MB PS-Poll frame 1506 in which the Band Info field 1660 (see FIG. 16) indicates that the STA has the radios on all 3 bands in the Awake state to be ready to receive the BUs on all 3 bands. The STA needs to ensure that its radios on the secondary BSSs are indeed in the Awake state latest by SIFS after the end of the MB PS-Poll frame 1506. The AP then proceeds with the multi-band transmission 1520.

Similarly, the MB TIM element 1530 indicates that the AP has BUs buffered for the STA in the Primary BSS and the Secondary BSS 1. STA responds with the MB PS-Poll frame 1532 indicate that its radios in the Secondary BSS is also in the Awake state. AP then proceeds with the multi-band transmission 1540.

Figure 16A:
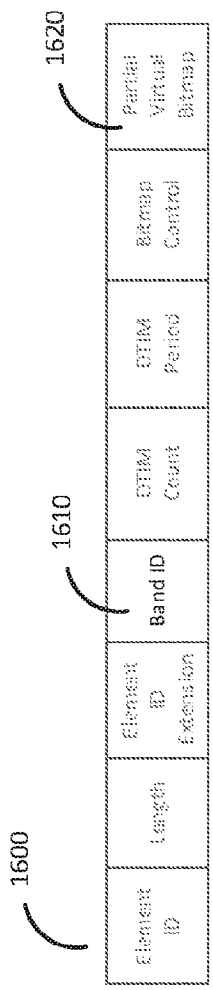
FIG. 16A is a multi-band TIM element, according to an example embodiment.

FIG. 16A is a multi-band TIM element 1600, according to an example embodiment. The multi-band TIM element 1600 is defined for use by an AP to indicate that it has Buffered Units (BU)s for the STA on another band indicated by the Band ID field 1610. This is useful when the AP maintains separate BSSs on different bands and may buffer traffic independently on different bands. The Partial Virtual Bitmap 1620 carries the bitmap of STA AIDs to indicate the presence of Buffered Units (BU)s for the STA. However, it is possible that the STA may be assigned different AIDs on different BSSs (on different bands), hence the position of a STA's bit in the bitmap may be different in different bands.

Figure 16B:
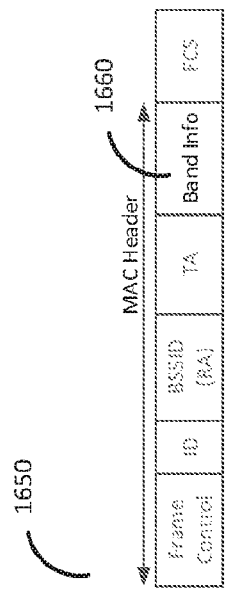
FIG. 16B is a multi-band PS-Poll frame, according to an example embodiment.

With reference to FIG. 16B, the multi-band PS-Poll frame 1650 is a multi-band variation of the PS-Poll frame with the additional Band Info field 1660 used by the STA to indicate the status of its radio on the different bands (e.g. 3 bits bitmap, 1 bit per frequency band, 1=Awake; 0=Doze). A primary purpose of the PS-Poll frame is for a STA in PS mode to indicate to the AP that it has transitioned to the Awake state. Even though the multi-band PS-Poll frame is only transmitted on the Primary band, the Band Info field 1660 may be used by the STA to indicate the status of its radio on the different bands.

Multi-Band Transmission Using Target Wake Time (TWT)

Figure 17:
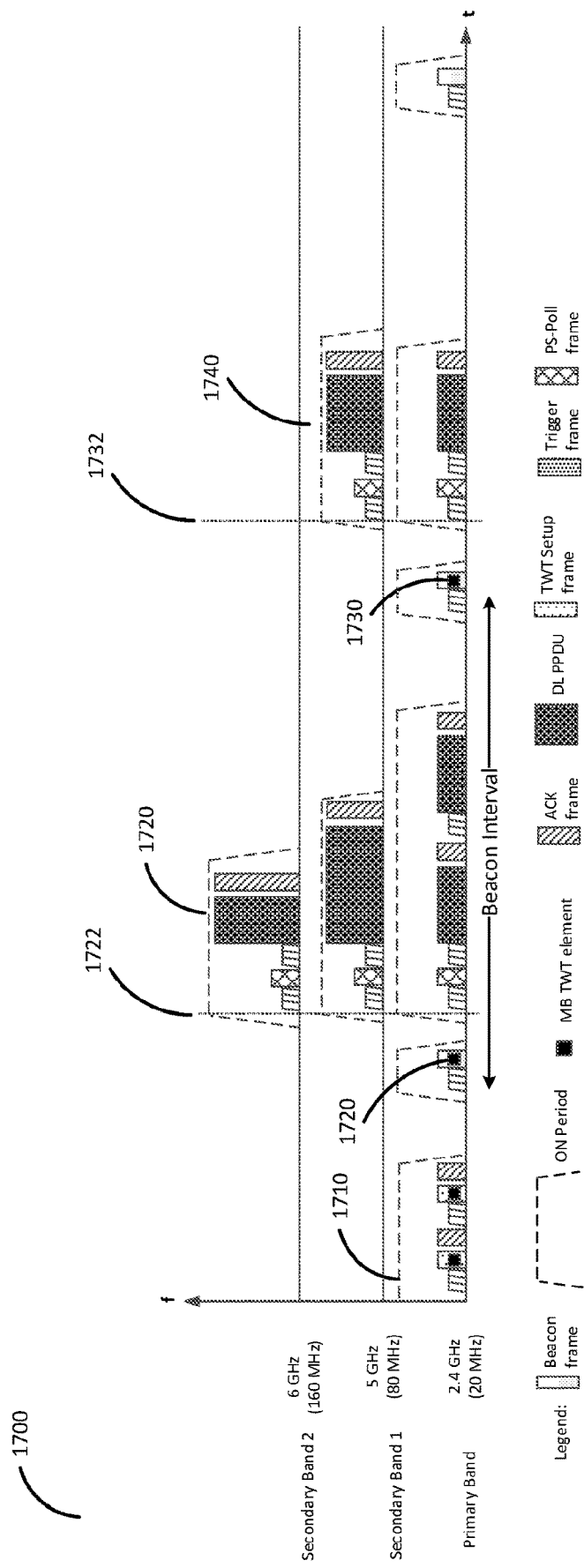
FIG. 17 illustrates an exemplary multi-band transmission to STAs, according to an example embodiment.

FIG. 17 illustrates an exemplary multi-band transmission to STAs, according to an example embodiment. FIG. 17 is similar to the multi-band transmission to STAs shown in FIG. 13, but assuming a Target Wake Time (TWT) feature is used by the STA.

During the TWT setup negotiation phase 1710, STA and AP include the MB TWT element 1800 (see FIG. 18) in the TWT setup frames and use the Band ID field 1810 to setup TWT SPs in all 3 bands. This is different from the legacy TWT setup where TWT SPs can only be setup in one band.

At TBTT (Target Beacon Transmission Time), the STA changes the radio of the Primary band to the Awake state to receive the Beacon frame. The AP includes the MB TWT element 1720 in the Beacon frame to indicate that AP has allocated broadcast TWT SPs on all 3 bands for the STA starting at time 1722. Although not shown in the figure, the AP may also include MB TIM elements 1512 in the Beacon frame to indicate that AP has BUs on all 3 bands/BSSs for the STA, implicitly indicating that it may initiate the multi-band transmission 1720 to the STA during the TWT SP. If the gap till time 1722 is large, the STA may also choose to move its radio on the Primary band back to Doze state. At the indicated TWT SP start time 1722, the STA transition its radio on all 3 bands to the Awake state and transmits the PS-Poll frames in each Band to indicate that the STA's radios on all 3 bands are in the Awake state and ready to receive the BUs on all 3 bands. The AP then proceeds with the multi-band transmission 1720. The STA may move back to the doze state at the end of the TWT SP on each band, or if the AP indicates that it has no more date for the STA in a band, the STA may also transition back to the doze state at the end of the transmission 1720 on each band.

Similarly, the MB TWT element 1730 indicates that the AP has allocated broadcast TWT SPs to the STA in the Primary BSS and the Secondary BSS 1. At the indicated TWT SP start time 1732, the STA transition its radio on the 2 bands to the Awake state and transmits the PS-Poll frames in each Band to indicate that the STA's radios on the 2 bands are in the Awake state. The AP then proceeds with the multi-band transmission 1740.

Figure 18:
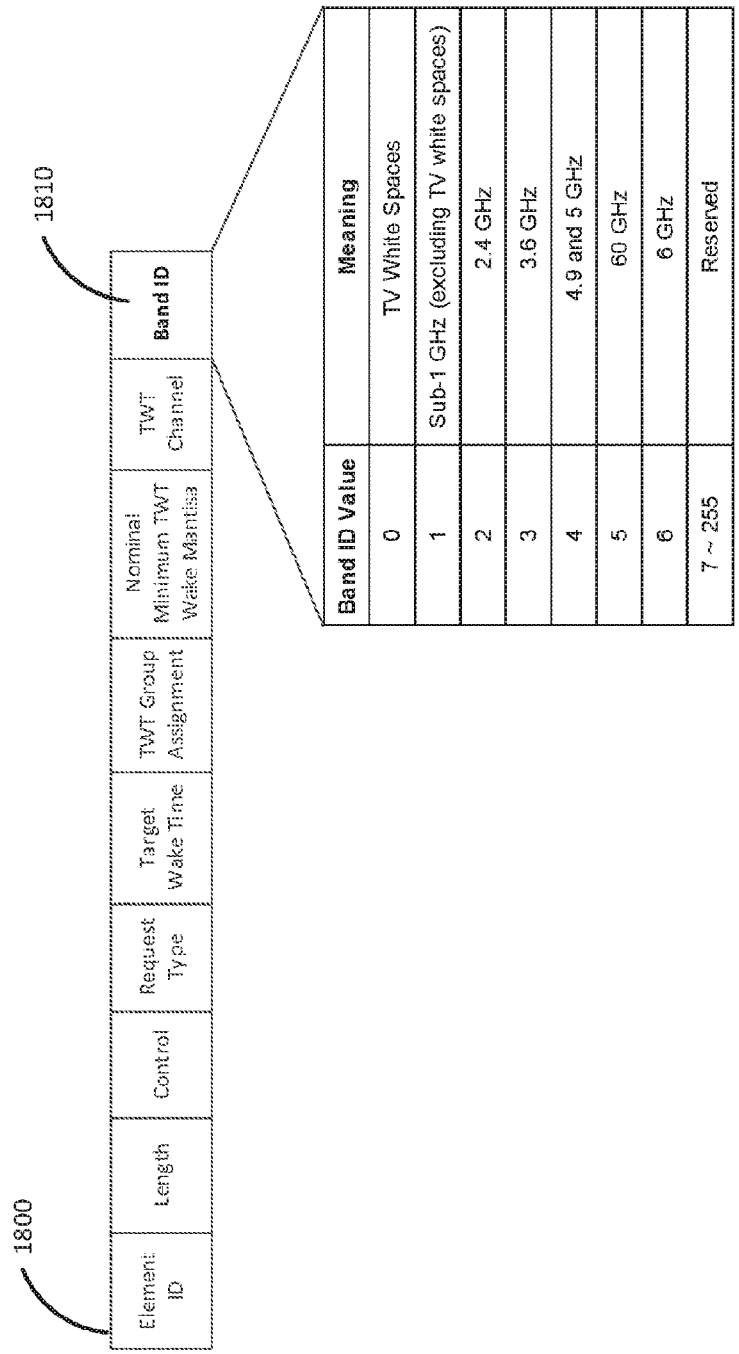
FIG. 18 shows a Multi-band (MB) Target Wake Time (TWT) element, according to an example embodiment.

FIG. 18 shows a Multi-band (MB) Target Wake Time (TWT) element 1800, according to an example embodiment. The MB TWT element 1800 is defined to negotiate/indicate TWT Service Periods (SP) in a different band (as indicated in the Band ID field 1810) from the band on which the element is transmitted.

Wake-Up Radio (WUR) Operation

Although, specific examples of Power Save schemes used by multi-band STAs have been provided above, they are not meant to be exhaustive. It is envisioned that the Multi-band Power Save scheme can accommodate various types of Power Save schemes currently defined for single band operation. Although only the case of TIM based PS mode and TWT operation were provided above, the MB Power save scheme can work equally well even if the multi-band STA uses other Power save schemes such as Automatic Power Save Delivery (APSD), Power Save Multi Poll (PSMP), Spatial Multiplexing (SM) Power Save, etc.

Figure 19:
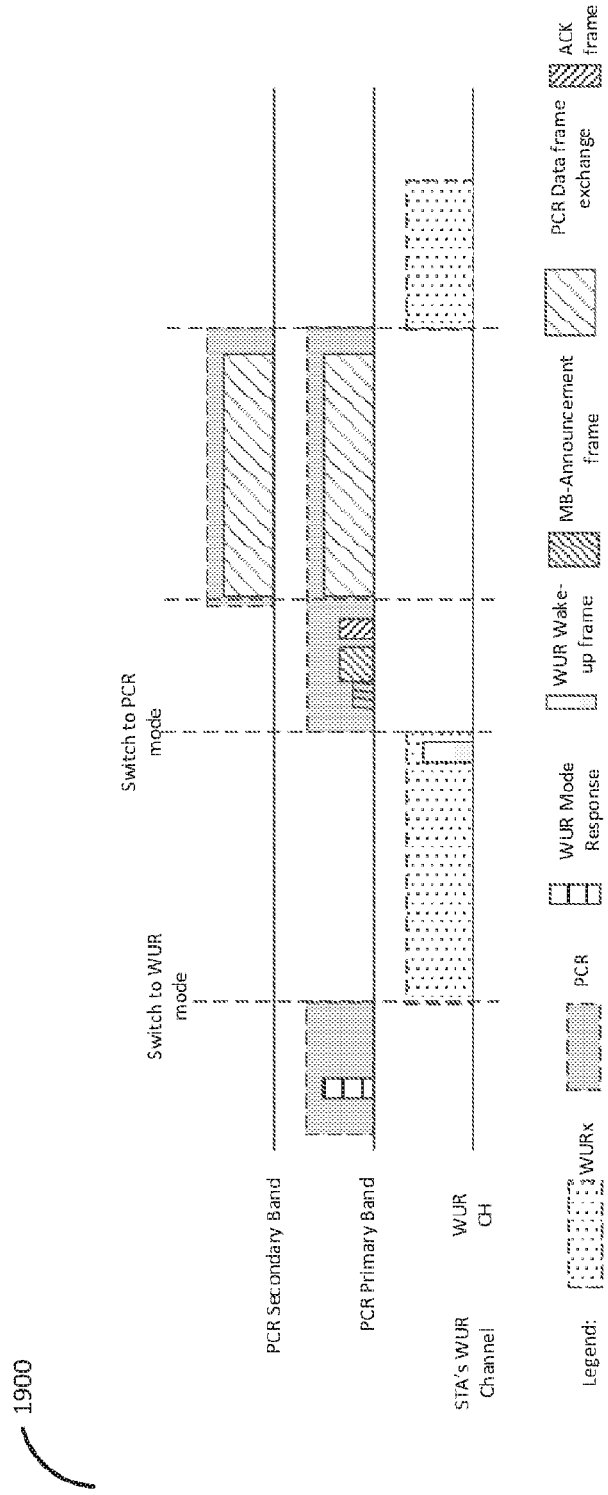
FIG. 19 shows a STA moving a PCR of a Secondary band to an Awake state before switching back to WURx idle listening, according to an example embodiment.

In particular, the multi-band STA can also support the Wake-up Radio (WUR) operation and has implemented the companion low power Wake-up Receiver (WURx). Such a STA, after negotiating WUR Mode operation with the AP and after receiving the WUR Mode Response frame from the AP, may turn all its Primary Connectivity Radios (PCR) to the Doze state on all PCR bands, and switch on its WURx. Subsequently upon receiving a WUR Wake-up frame from the AP, the STA moves the PCR of the Primary band to the Awake state, while the PCR of the Secondary bands continues in Doze state. After receiving a MB Announcement frame, the STA moves the PCR of the Secondary band to the Awake state as well to participate in multi-band transmission before switching back to the WURx idle listening at the end of the multi-band transmission. This is shown in FIG. 19.

Figure 20:
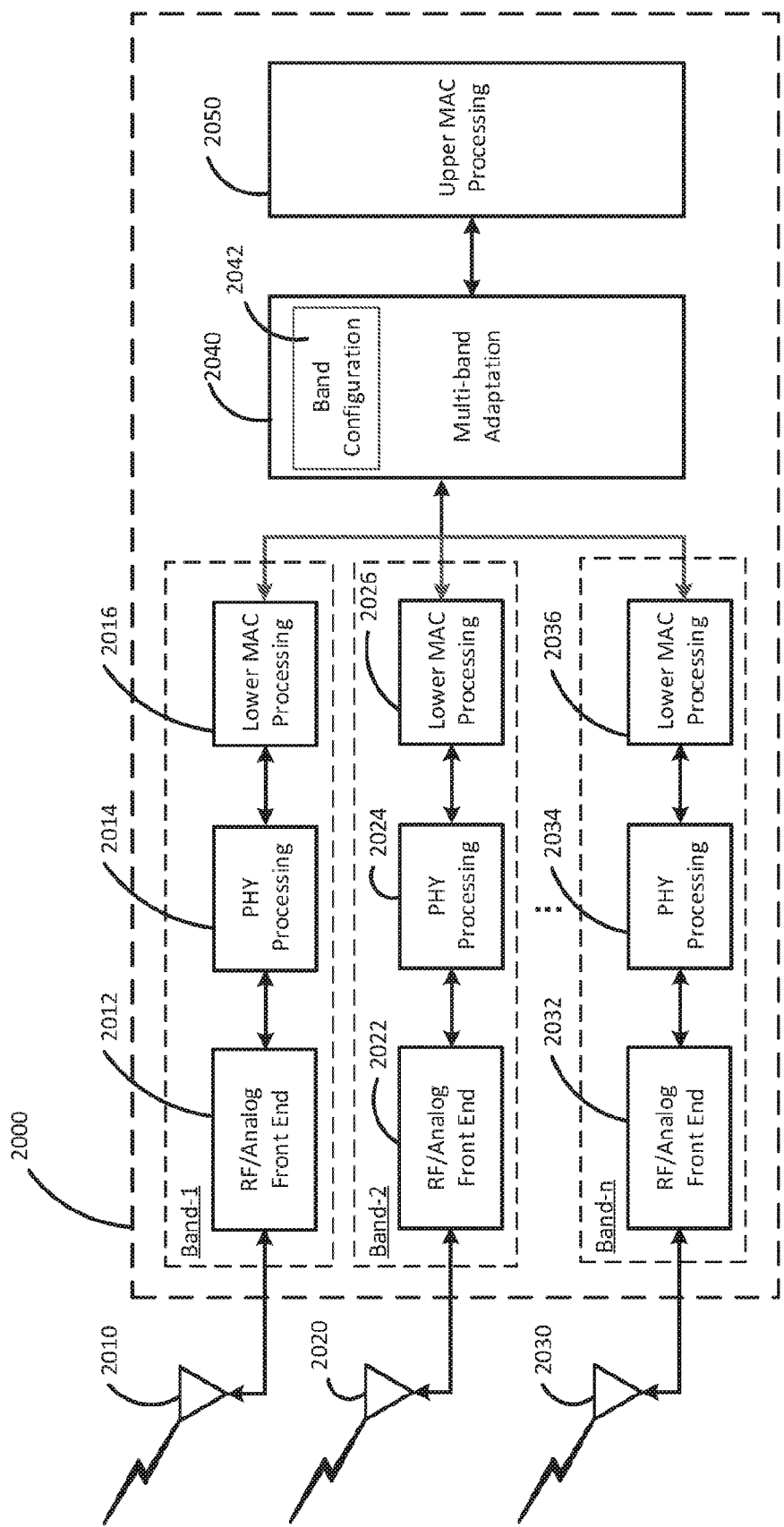
FIG. 20 is a simplified block diagram of a multi-band communication device that operates in multiple different frequency bands.

FIG. 20 is a simplified block diagram of a multi-band communication device 2000 that operates in multiple different frequency bands (shows as n bands with n being an integer greater than one). Antenna 2010 couples to and/or communicates with hardware/software in Band-1 that includes RF/Analog Front End 2012, PHY Processing 2014, and Lower MAC Processing 2016. Antenna 2020 couples to and/or communicates with hardware/software in Band-2 that includes RF/Analog Front End 2022, PHY Processing 2024, and Lower MAC Processing 2026. Antenna 2030 couples to and/or communicates with hardware/software in Band-n that includes RF/Analog Front End 2032, PHY Processing 2034, and Lower MAC Processing 2036. Although a single antenna and related band specific blocks are shown on each frequency band in FIG. 20, it is also possible that there may be multiple antennas and related band specific blocks on each frequency band, for example used for spatial diversity, Multi-User MIMO (MU-MIMO), etc. The Lower MAC Processing 2016/2026/2036 coupled to and/or communicate with each other and Upper MAC Processing 2050 via the Multi-band Adaptation 2040. The Multi-band Adaptation 2040 comprises a Band Configuration circuitry 2042.

A non-Access Point (AP) station (STA) can be represented by the multi-band communication device 2000. Accordingly, the multi-band communication device 2000 can include one or more transceiver circuitries, where each transceiver circuitry can include hardware which in operation transmits and receives data on a plurality of channels in different frequency bands. The hardware can include antennae, RF/Analog Front End, PHY Processing, and Lower MAC Processing (e.g. Antenna 2010, RF/Analog Front End 2012, PHY Processing 2014, and Lower MAC Processing 2016 in Band-1). The band configuration circuitry 2042 is operative to change a configuration of any one of the transceiver circuitries based on configuration information received from a multi-band Access Point (AP). The configuration information may specify one of the frequency bands as a Primary band and the other frequency bands as Secondary band(s). The transceiver circuitry operating on the Primary band is used as a default circuitry for communication with the AP. For example, the default circuitry can be the Antenna 2010, RF/Analog Front End 2012, PHY Processing 2014, and Lower MAC Processing 2016 in Band-1.

In addition, a multi-band Access Point (AP) station also can be represented by the multi-band communication device 2000. Accordingly, the multi-band communication device 2000 can include a transmitter, which in operation, transmits data comprising configuration information to a non-Access Point station (STA). The transmitter can include hardware such as antennae, RF/Analog Front End, PHY Processing, and Lower MAC Processing (e.g. antenna 2010, RF/Analog Front End 2012, PHY Processing 2014, and Lower MAC Processing 2016 in Band-1). Furthermore, the multi-band communication device 2000 can include a receiver, which in operation, receives frames from the STA, the frames comprising a Multi-band PS-Poll frame to indicate an Awake state or a Doze state of one of the frequency bands. Likewise, the receiver can include hardware such as antennae, RF/Analog Front End, PHY Processing, and Lower MAC Processing (e.g. antenna 2010, RF/Analog Front End 2012, PHY Processing 2014, and Lower MAC Processing 2016 in Band-1). The band configuration circuitry 2042 is operative to decide the Primary/Secondary designation of the frequency bands of multi-band non-AP STAs associated with the AP and also keeps track of the activation/de-activation status of the bands of the STAs.

Figure 21:
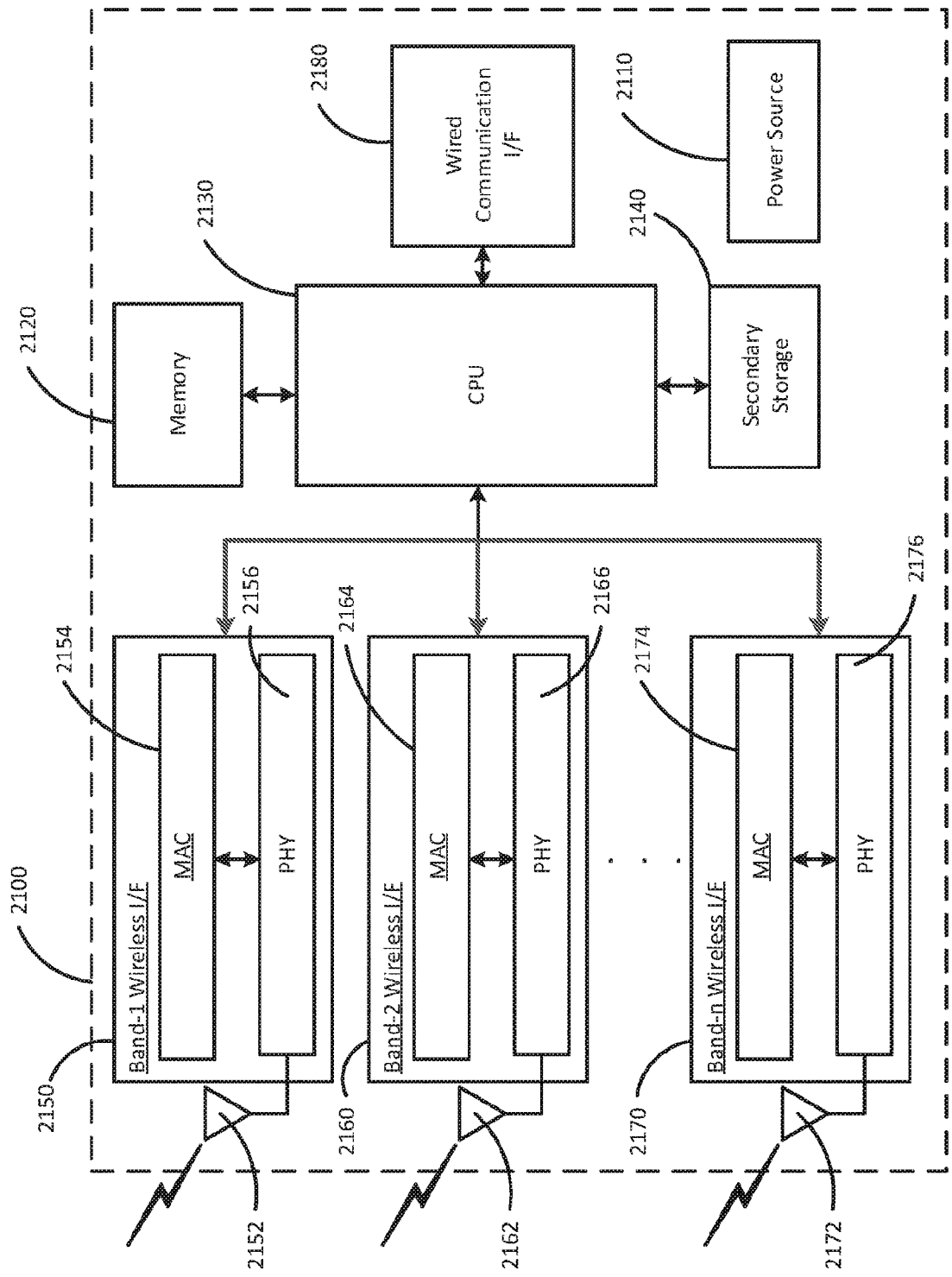
FIG. 21 is a detailed block diagram of a multi-band communication device that operates in multiple different frequency bands.

FIG. 21 is a detailed block diagram of a multi-band communication device 2100 that operates in multiple different frequency bands (shows as n bands with n being an integer greater than one). Band-1 Wireless I/F 2150 couples to and/or communicates with transmitter/receiver 2152 and includes MAC 2154 and PHY 2156. Band-2 Wireless I/F 2160 couples to and/or communicates with transmitter/receiver 2162 and includes MAC 2164 and PHY 2166. Band-n Wireless I/F 2170 couples to and/or communicates with transmitter/receiver 2172 and includes MAC 2174 and PHY 2176. Bands Wireless I/F 2150/2160/2170 couple to and/or communicate with each other and central processing unit (CPU) 2130, memory 2120, secondary storage 2140, wired communication I/F 2180. The circuit is powered with a power source 2110, which may be battery for non-AP devices while in the case of AP devices, may be main-powers in most cases. Although the block diagram 2100 is applicable to both AP and non-AP devices, each of the components used in an AP device may be a lot more complicated and powerful than those used in non-AP devices. When the block diagram 2100 is applicable to AP device, CPU 2130 generates frames that include actions related to a first frequency band (e.g. band-1) and to at least one other frequency band (e.g. band-2) in which the AP device transmits. When the block diagram 2100 is applicable to non-AP device, CPU 2130 generates frames in response to the received frames from AP device.

A non-Access Point (AP) station (STA) can be represented by the multi-band communication device 2100. Accordingly, the multi-band communication device 2100 can include one or more transceiver circuitries, where each transceiver circuitry can include hardware which in operation transmits and receives data on a plurality of channels in different frequency bands. The hardware can include a transmitter/receiver, MAC and PHY (e.g. transmitter/receiver 2152, MAC 2154 and PHY 2156 in Band-1 Wireless I/F 2150). The multi-band communication device 2100 can also include band configuration circuitry operative to change a configuration of any one of the transceiver circuitries based on configuration information received from a multi-band Access Point (AP). The band configuration circuitry may be implemented as a software module that runs on the CPU 2130, and may interact with the memory 2120, and secondary storage 2140. The configuration information specifies one of the frequency bands as a Primary band and the other frequency bands as Secondary band(s). The transceiver circuitry operating on the Primary band is used as a default circuitry for communication with the AP. For example, the default circuitry can be the transmitter/receiver 2152, MAC 2154 and PHY 2156 in Band-1 Wireless I/F 2150.

In addition, a multi-band Access Point (AP) station also can be represented by the multi-band communication device 2100. Accordingly, the multi-band communication device 2100 can include a transmitter (e.g. 2152), which in operation, transmits data comprising configuration information to a non-Access Point station (STA). Furthermore, the multi-band communication device 2100 can include a receiver (e.g. 2152), which in operation, receives frames from the STA, the frames comprising a Multi-band PS-Poll frame to indicate an Awake state or a Doze state of one of the frequency bands. The band configuration circuitry may be implemented as a software module that runs on the CPU 2130, and may interact with the memory 2120, and secondary storage 2140.

In FIG. 21, the Lower MAC functions may be implemented within the Wireless I/Fs (in hardware/firmware), while the Multi-band Adaptation layer as well as Upper MAC functions may be implement as software within the CPU.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Other example embodiments include, but are not limited to the following examples.

A multi-band communication device including: one or more transceiver circuitries, each of which in operation transmits and receives data on a plurality of channels in different frequency bands; and a band configuration circuitry operative to change a configuration of any one of the transceiver circuitries based on configuration information received from a multi-band Access Point (AP). The configuration information specifies one of the frequency bands as a Primary band and the other frequency bands as Secondary band(s). The transceiver circuitry operating on the Primary band is used as a default circuitry for communication with the AP.

The configuration information may further specify whether the plurality of channels in each of the different frequency bands are to be used for uplink, downlink or bi-directional communication.

When the multi-band communication device is operating in an Active mode, the transceiver circuitry operating on the Primary band is activated and the transceiver circuitry operating on the Secondary band(s) are deactivated.

An indication of a multi-band frame exchange sequence may be received from the AP on one of the frequency bands, and the band configuration circuitry may be operative to: (i) activate the transceiver circuitry operating on at least one of the other frequency bands in time for start of the multi-band frame exchange sequence and (ii) deactivate the at least one of the other frequency bands upon completion of the multi-band frame exchange sequence.

The indication of the multi-band frame exchange sequence may be received on the Primary band and/or on any frequency band that is active.

The indication of the multi-band frame exchange sequence may further specify an Active Duration, and the band configuration circuitry may be operative to keep the transceiver circuitry operating on the at least one of the other frequency bands activated for the specified Active Duration.

The band configuration circuitry may be further operative to: (i) activate the transceiver circuitries operating on the Secondary band(s) and (ii) report activated frequency bands to the AP.

When the multi-band communication device is operating in a Power Save (PS) mode, the transceiver circuitry operating on the Primary band may transition to an Awake state or a Doze state independent of the Awake state or the Doze state of the Secondary band(s).

The multi-band communication device may be further operative to receive, from the AP on one of the frequency bands, an indication of Buffered Units (BUs) for at least one of the other frequency bands.

The multi-band communication device may be further operative to transmit, to the AP on the one of the frequency bands, a frame to indicate the Awake state or the Doze state of the at least one of the other frequency bands.

The multi-band communication device may be further operative to exchange frames with the AP on one of the frequency bands, the frames comprising data to negotiate a Target Wake Time (TWT) Service Period (SP) on at least one of the other frequency bands.

The multi-band communication device may be further operative to receive, from the AP on one of the frequency bands, a Beacon frame comprising an indication of Target Wake Time (TWT) Service Period (SP) allocated to the multi-band communication device on at least one of the other frequency bands.

The band configuration circuitry may be further operative to designate the frequency band that is used by the multi-band communication device to associate with the AP as the Primary band.

A multi-band access point (AP) including: a transmitter, which in operation, transmits data comprising configuration information to a multi-band non-Access Point station (STA), the STA operative to transmit and receive data on a plurality of channels in different frequency bands, wherein the configuration information specifies one of the frequency bands as a Primary band and the other frequency bands as Secondary band(s), wherein the Primary band is used by the STA as a default band for communication with the AP.

The multi-band access point (AP) may further include a band configuration circuitry operative to: determine which one of the frequency bands is designated as the Primary band or the Secondary band; generate the configuration information based on the determination; and track an activation/deactivation status of each of the frequency bands.

The multi-band access point (AP) may further include a receiver, which in operation, receives frames from the STA, the frames comprising a Multi-band PS-Poll frame to indicate an Awake state or a Doze state of one of the frequency bands.

The transmitter, in operation, may further transmit a Beacon frame on the Primary band, the Beacon frame comprising an indication of Target Wake Time (TWT) Service Period (SP) allocated to the STA on at least one of the Secondary bands.

The configuration information may further specify a Basic Service Set (BSS) on the Primary band as a Primary BSS and BSSs on the Secondary bands as Secondary BSSs.

A communication method including: receiving configuration information, by a non-Access Point station (STA) from an access point (AP), wherein the STA is operative to transmit and receive data on a plurality of channels in different frequency bands using one or more transceiver circuitries of the STA; and changing, by a band configuration circuitry of the STA, a configuration of any one of the transceiver circuitries based on the received configuration information, wherein the configuration information specifies one of the frequency bands as a Primary band and the other frequency bands as Secondary band(s), and wherein the Primary band is used by the STA as a default band for communication with the AP.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing exemplary embodiments of the disclosure, it being understood that various changes may be made in the function and arrangement of steps and method of operation described in the exemplary embodiments without departing from the scope of the disclosure as set forth in the appended claims.

What is claimed is:

1. A non-Access Point (non-AP) multi-band device comprising:
    a receiver, which, in operation, receives a frame transmitted on a first band, the frame including a Partial Virtual Bitmap and a per-band bitmap subfield,
        the Partial Virtual Bitmap indicating existence or non-existence of buffered unit(s) for each of a plurality of non-AP multi-band devices that include the non-AP multi-band device and at least one other non-AP multi-band device, and
        the per-band bitmap subfield indicating existence or non-existence of the buffered unit(s) for the non-AP multi-band device on each of a plurality of bands including the first band and a second band; and
    circuitry, which, in operation, retrieves downlink data from the buffered unit(s) based on the Partial Virtual Bitmap and the per-band bitmap subfield.

2. The non-AP multi-band device of claim 1, wherein if a power management mode of the non-AP multi-band device is a Power Save mode, a default power state of each of the plurality of bands is a doze state, and the circuitry changes a power state of a band on which the buffered unit(s) exist from the doze mode to an awake mode.

3. The non-AP multi-band device of claim 1, wherein at least a portion of the per-band bitmap subfield corresponds to a first station ID of the non-AP multi-band device.

4. The non-AP multi-band device of claim 3, wherein the frame includes another per-band bitmap subfield corresponding to a second station ID of another non-AP multi-band device.

5. The non-AP multi-band device of claim 1, wherein the frame is a beacon frame.

6. The non-AP multi-band device of claim 1, wherein the frame includes a direction subfield indicating a downlink/uplink direction of the frame.

7. The non-AP multi-band device of claim 1, wherein a frame exchange during association with an AP multi-band device is performed only on the first band.

8. The non-AP multi-band device of claim 1, wherein Target Wake Time (TWT) agreements across the plurality of bands are negotiated with an AP multi-band device.

9. A communication method for a non-Access Point (non-AP) multi-band device, the communication method comprising:
    receiving a frame transmitted on a first band, the frame including a Partial Virtual Bitmap and a per-band bitmap subfield,
        the Partial Virtual Bitmap indicating existence or non-existence of buffered unit(s) for each of a plurality of non-AP multi-band devices that include the non-AP multi-band device and at least one other non-AP multi-band device, and
        the per-band bitmap subfield indicating existence or non-existence of the buffered unit(s) for the non-AP multi-band device on each of a plurality of bands including the first band and a second band; and
    retrieving downlink data from the buffered unit(s) based on the Partial Virtual Bitmap and the per-band bitmap subfield.

10. The communication method of claim 9, wherein if a power management mode of the non-AP multi-band device is a Power Save mode, a default power state of each of the plurality of bands is a doze state, and a power state of a band on which the buffered unit(s) exist is changed from the doze mode to an awake mode.

11. The communication method of claim 9, wherein at least a portion of the per-band bitmap subfield corresponds to a first station ID of the non-AP multi-band device.

12. The communication method of claim 11, wherein the frame includes another per-band bitmap subfield corresponding to a second station ID of another non-AP multi-band device.

13. The communication method of claim 9, wherein the frame is a beacon frame.

14. The communication method of claim 9, wherein the frame includes a direction subfield indicating a downlink/uplink direction of the frame.

15. The communication method of claim 9, wherein a frame exchange during association with an AP multi-band device is performed only on the first band.

16. The communication method of claim 9, wherein Target Wake Time (TWT) agreements across the plurality of bands are negotiated with an AP multi-band device.

* * * * *